US008830189B2

(12) United States Patent
Rimon et al.

(10) Patent No.: US 8,830,189 B2
(45) Date of Patent: Sep. 9, 2014

(54) DEVICE AND METHOD FOR MONITORING THE OBJECT'S BEHAVIOR

(75) Inventors: Ori Rimon, Tel Aviv (IL); Rafi Zachut, Rishon Le'zion (IL); Vered Cohen Sharvit, Modiin (IL)

(73) Assignee: ZRRO Technologies (2009) Ltd., Tel Aviv (IL)

(*) Notice: Subject to any disclaimer, the term of this patent is extended or adjusted under 35 U.S.C. 154(b) by 142 days.

(21) Appl. No.: 13/190,935

(22) Filed: Jul. 26, 2011

(65) Prior Publication Data
US 2011/0279397 A1 Nov. 17, 2011

Related U.S. Application Data

(63) Continuation-in-part of application No. PCT/IL2010/000063, filed on Jan. 26, 2010.

(60) Provisional application No. 61/147,357, filed on Jan. 26, 2009.

(51) Int. Cl.
*G06F 3/0488* (2013.01)
*G06F 3/044* (2006.01)
*G06F 3/046* (2006.01)
*G06F 3/048* (2013.01)

(52) U.S. Cl.
CPC ............... *G06F 3/044* (2013.01); *G06F 3/046* (2013.01); *G06F 2203/04808* (2013.01); *G06F 3/048* (2013.01)
USPC ........... 345/173; 345/174; 345/175; 345/176; 345/177; 345/178; 345/179

(58) Field of Classification Search
USPC ............. 345/173–183; 178/18.01–18.11
See application file for complete search history.

(56) References Cited

U.S. PATENT DOCUMENTS 4,550,221 A 10/1985 Mabusth
4,988,981 A 1/1991 Zimmerman et al.
(Continued)

FOREIGN PATENT DOCUMENTS

DE 10 2007 016 408 A1 10/2008
EP 0 846 286 B1 2/2002
(Continued)

OTHER PUBLICATIONS

International Search Report dated Jan. 13, 2012 issued in International Patent Application No. PCT/IL2011/000715.
(Continued)

*Primary Examiner* — Joe H Cheng
*Assistant Examiner* — Lisa Landis
(74) *Attorney, Agent, or Firm* — Browdy and Neimark, PLLC

(57) ABSTRACT

A monitoring unit is presented for use in monitoring a behavior of at least a part of a physical object. The monitoring unit comprises: a data input module configured for receiving measured data indicative of a behavior of at least a part of the physical object in a certain coordinate system associated with a predetermined sensing surface; and a digital signal processor configured and operable to be responsive to said measured data for transforming the measured data into an approximate representation of said at least portion of the physical object into a virtual coordinate system such that the transformation maintains a positional relationship between virtual points and corresponding portions within said at least part of the physical object. This technique enables further formatting of said approximate representation into a predetermined data input format of a certain electronic device.

37 Claims, 23 Drawing Sheets

(56) References Cited

U.S. PATENT DOCUMENTS

| | | | |
|---|---|---|---|
| 5,381,158 | A | 1/1995 | Takahara et al. |
| 5,495,077 | A | 2/1996 | Miller et al. |
| 5,543,588 | A | 8/1996 | Bisset et al. |
| 6,323,846 | B1 | 11/2001 | Westerman et al. |
| 6,452,514 | B1 | 9/2002 | Philipp |
| 6,498,590 | B1 | 12/2002 | Dietz et al. |
| 7,205,979 | B2 | 4/2007 | Zimmerman et al. |
| 2007/0291007 | A1* | 12/2007 | Forlines et al. ............ 345/173 |
| 2008/0007542 | A1 | 1/2008 | Eliasson et al. |
| 2008/0059915 | A1 | 3/2008 | Boillot |
| 2008/0158173 | A1 | 7/2008 | Hamblin et al. |
| 2008/0297487 | A1* | 12/2008 | Hotelling et al. .......... 345/173 |
| 2009/0256817 | A1 | 10/2009 | Perlin et al. |
| 2010/0164897 | A1* | 7/2010 | Morin et al. ................ 345/173 |

FOREIGN PATENT DOCUMENTS

| | | |
|---|---|---|
| EP | 1811360 A1 | 7/2007 |
| FR | 2662528 A1 | 11/1991 |
| JP | 63024319 | 1/1988 |
| JP | A-2003-67107 | 3/2003 |
| JP | 2006072854 A | 3/2006 |
| JP | 2007226820 A | 9/2007 |
| JP | A-2010-61224 | 3/2010 |
| WO | WO 2007/017848 A2 | 2/2007 |
| WO | WO 2010/084498 A1 | 7/2010 |

OTHER PUBLICATIONS

Huang, H., "Depth of Investigation for Small Broadband Electromagnetic Sensors," *Geophysics*, Nov.-Dec. 2005, pp. G135-G142, vol. 70, No. 6.

Rekimoto et al., "SmartSkin: An Infrastructure for Freehand Manipulation on Interactive Surfaces," vol. 4, No. 1, Apr. 20, 2002, pp. 113-120.

Office Action for European Patent Application No. 10 709 072.2, dated Mar. 4, 2014.

* cited by examiner

DEVICE AND METHOD FOR MONITORING THE OBJECT'S BEHAVIOR

FIELD OF THE INVENTION

This invention relates to a device and method for monitoring behavior of a physical object.

BACKGROUND OF THE INVENTION

Various techniques have been developed for monitoring the behavior of an object. One type of such techniques utilizes one or more imagers (cameras) with an appropriate field(s) of view for tracking the object motion at the object location. Another type of the monitoring techniques of the kind specified utilizes proximity sensors for tracking the object's movement in the vicinity of the object.

Some known techniques are disclosed for example in U.S. Pat. No. 5,543,588 and WO07/017,848. U.S. Pat. No. 5,543,588 describes a handheld computing device which comprises a thin enclosure having two opposing major faces. A display screen is disposed on a first one of the major opposing faces of the enclosure and a touch-sensitive object position detector input device is disposed on a second one of the major opposing faces of the enclosure. Computing device circuitry, circuitry for interfacing the touch-sensitive object position detector to the computing device circuitry, and circuitry for driving the display screen are all disposed within the enclosure. WO07/017,848 describes a system for determining information regarding at least one object. The system comprises a sensor sensitive to capacitive coupling; at least one object adapted to create a capacitive coupling with the sensor when at least one signal is input to the sensor; a detector adapted to measure at least one output signal of said sensor associated with the at least one object, wherein the output signal associated with the at least one object is an object information code.

GENERAL DESCRIPTION

Direct manipulation methods enable to target any position on the display in a single human action (just tapping on the object) but they are limited by to the fact that the display should be located in an arm reach distance from the user. In most cases the display is mobile. If the screen is stationary (and thus in most cases vertically mounted) an ergonomic problem arises when the hand is being held hang inconveniently for a long time. Indirect manipulations have no distance limitation but require followed actions for targeting: first positioning (usually by dragging the cursor to the required position), second activation (usually by a predefined touch gesture such as tapping or hovering). Simple actions such as activating a virtual buttons become very slow, and not natural.

Where touch or multi touch interface are becoming standards, a scenario in which displays are distant from the users—like the case of a standard living room arrangement where TV is distant from the user, become a barrier to variety of multi touch applications.

There is a need in the art for a novel monitoring system for monitoring the behavior of an object (preferably in a three-coordinate space), remotely from the object's location. Such need is associated with the following. It is often the case that an electronic device is to be input/controlled with/by user's data in a typically data input fashion, i.e. that identifiable by the device as being provided through its data input utilities, e.g. keyboard-based arrangement of symbols.

For example, the inventors have found that recently developed models of portable electronic devices (e.g. phone device) are equipped with modern facilities (including inter alia external interfaces) allowing direct connection of the portable device to an appropriately provided connection port at a TV set or host computer and perform data exchange between them. This, however impedes, and practically makes impossible, for user to implement data input through the portable device.

Thus, it would be desirable to provide a simple and cost effective technique enabling the use of this modern technique via remote operation of the portable electronic device while the latter is connected to the host or direct operation of the host from a remote controller in a manner as if said controller would be connected to the host.

Thus, the invention provides a method for monitoring behavior of at least a part of a physical object. According to this method measured data is provided being indicative of a behavior of at least a part of the physical object with respect to a predetermined sensing surface in a first coordinate system; and the measured data is processed and transformed into an approximate representation of said behavior in a second virtual coordinate system, the transformation maintaining a positional relationship between virtual points and corresponding portions of the physical object. Preferably, the measured data is indicative of the behavior of at least a part of the object in a 3D space (3D coordinate system). This technique actually enables simulation of touch-screen experience of the object on a remote screen, e.g. activating buttons, applying gestures. etc.

The approximate representation may comprise representation of said at least part of the physical object. The predetermined sensing surface defines said first coordinate system, which may be being a remote coordinate system with respect to the virtual coordinate system. The processing of the measured data indicative of the behavior of said at least part of the physical object comprises object independent interpretation of the measured data. The sensing surface may be capable of generating said measured data in either one or a combination of both contact and contactless modes. The sensing surface may be capable of detecting absolute or relative position for each of said corresponding portions of the physical object with respect to the sensing surface. The measured data may be in the form of a signal intensity map in said first coordinate system, while transforming comprises processing said signal intensity map.

The measured data may be generated by a sensor matrix of said predetermined sensing surface. The sensor matrix of the sensing surface may be capable of detecting user finger hand and tip locations in said first coordinate system. Generally, the sensor matrix suitable to be used in the invention may be of any known suitable type, including but not limited to the following: capacitive sensor matrix, acoustic sensor matrix, electro-magnetic sensor (e.g. infrared sensor that can actually measure temperatures of a human body regardless of ambient light level, i.e. even in total darkness; microwave sensor; RF sensor; optical or electro-optical sensor in which case an ambient light generator is used to enable sensor operation in darkness).

The approximate representation may be used for activating a virtual object, thereby allowing representation or display of one or more portions of the physical object.

The data indicative of said approximate representation may be transmitted to a remote location of said virtual coordinate system. Alternatively, the measured data may be transmitted to a remote location of said virtual coordinate system, enabling said processing of the measured data to transform it into said approximate representation at said remote location. The data transmitting may comprise wireless signal transmission including at least one of IR, Bluetooth, radio frequency (RF), and acoustic transmission.

In some embodiments of the invention, the sensing surface of the position sensor device is the surface of a proximity sensor matrix. Generally, however, the sensing surface may not be that of an active sensing utility but may be a reference surface which is considered by another sensing utility (of any known suitable type) to define the coordinate system for measurements.

The method further comprises formatting data indicative of said approximate representation into a predetermined format of data input into a certain electronic device.

It should be understood that data indicative of the object's (or part thereof) behavior may comprise one or more of the following: a position of the portions of the physical object with respect to said predetermined sensing surface; a change in position of the portions of the physical object with respect to said predetermined sensing surface; a motion pattern of the portions of the physical object with respect to said predetermined sensing surface.

The provision of the data indicative of the behavior of at least a part of the physical object may comprise detection of the position of said at least part of the object using a continuous detection mode and/or a sampling detection mode.

Preferably, the invention utilizes the measured data indicative of said behavior in a three-dimensional space. The approximate representation may correspond to the behavior of said at least part of the physical object in the three dimensional coordinates system.

The transformation may comprise determination of data indicative of a distance between each of the virtual points and each of the corresponding portions of said at least part of the physical object; and/or data indicative of a path along which position of said at least part of the physical object is being changed with respect to the sensing surface.

The method may also comprise identification of said at least part of the physical object, to thereby selectively allow generation of the measured data.

In some embodiments, the invention also comprises identification of noise energy in the vicinity of the proximity sensor matrix and selective operation of the proximity sensor matrix accordingly. For example, the noise energy is identified by a frequency being in or at least partially overlapping an operative frequency range of said proximity sensor matrix, in which case the operation of the proximity sensor matrix upon identifying the noise energy comprises either preventing measurements by said proximity sensor matrix or shifting the operative frequency to be outside of said range.

It should also be noted that the physical object may be associated with at least a part of a human body, e.g. a hand and/or finger and/or multiple fingers.

The approximate representation may for example comprise data indicative of a shape of said at least part of the physical object; and/or data indicative of a pattern corresponding to said at least part of the physical object; and/or data indicative of a shape of at least part of the physical object.

In some applications of the invention, the coordinate system at the remote to location is associated with a display unit.

According to another broad aspect of the invention, there is provided a monitoring unit for use in monitoring a behavior of at least a part of a physical object. The monitoring unit comprises a data input module configured for receiving measured data indicative of a behavior of at least part of the physical object in a certain three-dimensional coordinate system associated with a predetermined sensing surface; and a processor configured and operable to be responsive to said measured data for transforming the measured data into an approximate representation of said at least portion of the physical object into a virtual coordinate system such that the transformation maintains a positional relationship between virtual points and corresponding portions within said at least part of the physical object, thereby enabling formatting of said approximate representation into a predetermined format of data input into a certain electronic device.

According to yet further aspect of the invention, it provides a device for use in monitoring a behavior of a physical object, the device comprising: the above-described monitoring unit, and a position sensor device linked to the input data module of the monitoring unit, said position sensor device defining said sensing surface and said certain coordinate system and being configured an operable to generate said measured data indicative of the behavior of said at least part of the physical object in said certain coordinate system.

As indicated above, the position sensor device may comprises a proximity sensor matrix capable of generating said measured data in either one or a combination of both of contact and contactless modes.

The device for monitoring the object's may also comprise a transmitter unit configured for transmitting data indicative of said approximate representation of said at least part of the physical object to a remote location of said virtual coordinate system. The data transmission may be via wires or may be wireless. In the latter case, data may be transmitted in at least one of IR, Bluetooth, RF and acoustic transmission modes. The device may comprise a formatter utility connectable to output of the processor or to output of the transmitter unit and configured and operable to receive data indicative of said approximate representation and converting said data into a predetermined format of data input into a certain electronic device.

The proximity sensor matrix of the position sensor device may be associated with a keypad of an electronic device where the approximate representation of said behavior is to be applied, said measured data being indicative of the behavior of user's fingers with respect to symbols of the keypad.

According to yet another aspect of the invention, there is provided a device for use in monitoring a behavior of a physical object, the device comprising: the above described monitoring unit, and a data input unit configured to define said virtual coordinate system, said data input unit being linked to output of said signal processor for receiving data indicative of said approximate representation.

Similarly, the device may comprise the above described formatter utility interconnected between the output of the signal processor and the data input unit. The device may also comprise a signal receiver unit configured for receiving the measured data indicative of said behavior with respect to the sensing surface. The measured data may be in the form of at least one of IR, Bluetooth, RF and acoustic data, and the receiver unit is thus configured accordingly for receiving the measured data and generating corresponding data input into said signal processor.

The invention in its yet further aspect provides a system for monitoring a behavior of at least a part of a physical object. The system comprises: a position sensor comprising a sensing surface and defining a first three dimensional coordinate system within a sensing region in the vicinity of the sensing surface, the position sensor being configured an operable to generate measured data indicative of the behavior of at least part of the physical object with respect to said sensing surface in said first coordinate system; (b) a data presentation device defining a second coordinate system; and (e) a processor interlinked between the position sensor device and said data presentation device, and being configured and operable to be responsive to said measured data for transforming the measured data into an approximate representation of said at least part of the physical object into the second coordinate system such that the transformation maintains a positional relationship between virtual points and corresponding portions within said at least part of the physical object.

According to yet further aspect of the invention, there is provided a hand held device for use in monitoring a behavior of a physical object, the device comprising a monitoring unit comprising: a position sensor device having a sensing surface and defining a sensing region in the vicinity of the sensing surface and being configured and operable to generate measured data indicative of behavior of at least part of a physical object in a certain three-dimensional coordinate system within said sensing region; and a processor configured and operable to be responsive to data indicative of said measured data for transforming said data into an approximate representation of said at least portion of the physical object into a virtual coordinate system such that the transformation maintains a positional relationship between virtual points and corresponding portions within said at least part of the physical object, thereby enabling transmission of said approximate representation to a certain electronic device.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 6A is an exemplary circuit with capacitive sensing pad; FIG. 6B perspective projection of an equivalent circuit; FIG. 6C shows a shunt capacitive configuration; FIG. 6D shows a configuration utilizing signal transmission via user body; and FIG. 6E illustrates the function of voltage measurement versus proximity to a proximity sensing matrix.

FIG. 15 shows an example of a hand model and FIG. 16 shows a flow chart of the processing method based in this model.

DETAILED DESCRIPTION OF EMBODIMENTS

Figure 1A:
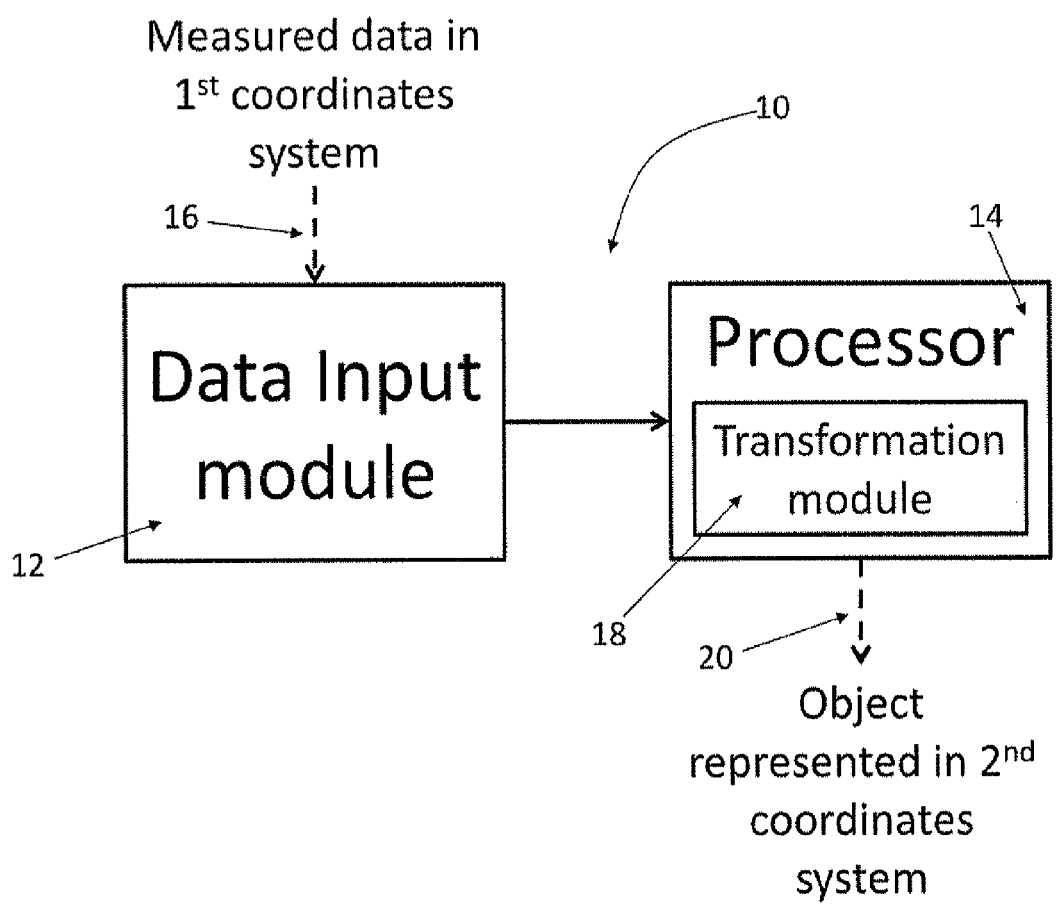
FIG. 1A illustrates a block diagram of a monitoring unit according to the invention for use in monitoring the object's behavior remotely from the object's location.

Reference is made to FIG. 1A which illustrates, by way of a block diagram, an example of a monitoring unit 10 configured and operable according to the invention for monitoring behavior of a physical object. The invention provides for monitoring the object's behavior remotely from the object's location, i.e. remotely from a location where the behavior to be monitored is originated. The object's behavior, typically motion, can be monitored in a two-dimensional (2D) space. Preferably, however, the invention utilizes 3D motion data. The monitoring unit 10 includes a data input module 12 and a processor utility 14 (e.g. digital signal processor).

The data input module 12 is adapted for receiving measured data 16 from a position sensor device. The latter may be of any known suitable type, for example including a proximity sensor matrix. The invention will be exemplified below as using the position sensor device of the kind including a proximity sensor matrix. But it should be understood that the inventive concept is not limited to any type of a sensor system for the object position detection, provided such sensor system is capable of detecting the object's behavior (tracking the object's position in a 2D or preferably 3D coordinate system).

The measured data is indicative of a behavior of at least a portion of a certain physical object in a first coordinate system associated with the proximity sensor matrix. The physical object can be associated with at least a portion of an individual's hand or finger, or multiplicity of fingers. The behavior of the physical object encompasses the position of the object or one or more portions thereof with respect to the proximity sensor matrix. The latter typically includes an array (one- or two-dimensional array) or generally a spatial arrangement of a plurality of spaced-apart proximity sensors. Typically, a proximity sensor matrix may include sensors arranged in row and column configuration including m rows and n columns within a sensing plane or curved surface defined by a substrate supporting the matrix or a single monolithic piece in which the matrix is embedded. The arrangement of sensors defines the first coordinate system for detection of the object behavior.

The proximity sensor may be of any known suitable kind capable of locating a point or region (determining coordinates or relative coordinate thereof) relative to the sensor in the vicinity of the sensor, i.e. within the sensor's sensitivity zone. It should be noted that such locating is preferably aimed at determining a 3D location, but generally may utilize 2D location scheme, or may be switchable between 2D and 3D models. It should also be understood that the sensitivity zone may be at a 0 distance from the sensor, the sensor being thus a contact- or touch-type sensor; or may be higher than zero, the sensor being thus contactless type sensor. The proximity sensor may operate in a continuous measurement mode or with a certain sampling mode to determine a distance (or generally three coordinates) of the object or a point thereof. As will be exemplified further below, the proximity sensor matrix may utilize capacitive proximity sensors. The principles of construction and operation of such sensors are known per se and therefore need not be described in details, except to note that the may be the so-called "active" or "passive" sensor. The active sensor of the kind specified generates an electric field in the vicinity of the sensor, and when a physical object approaches the sensor (its sensing surface) it effects a change in the electric field, which change is detected and is indicative of the location of the object relative to said sensor. The passive sensor is generally similar to the active one, but does not utilize generation of the electric field but rather is sensitive to a change of an external electric field (due to the object's relative position) in the vicinity thereof.

Figure 1B:
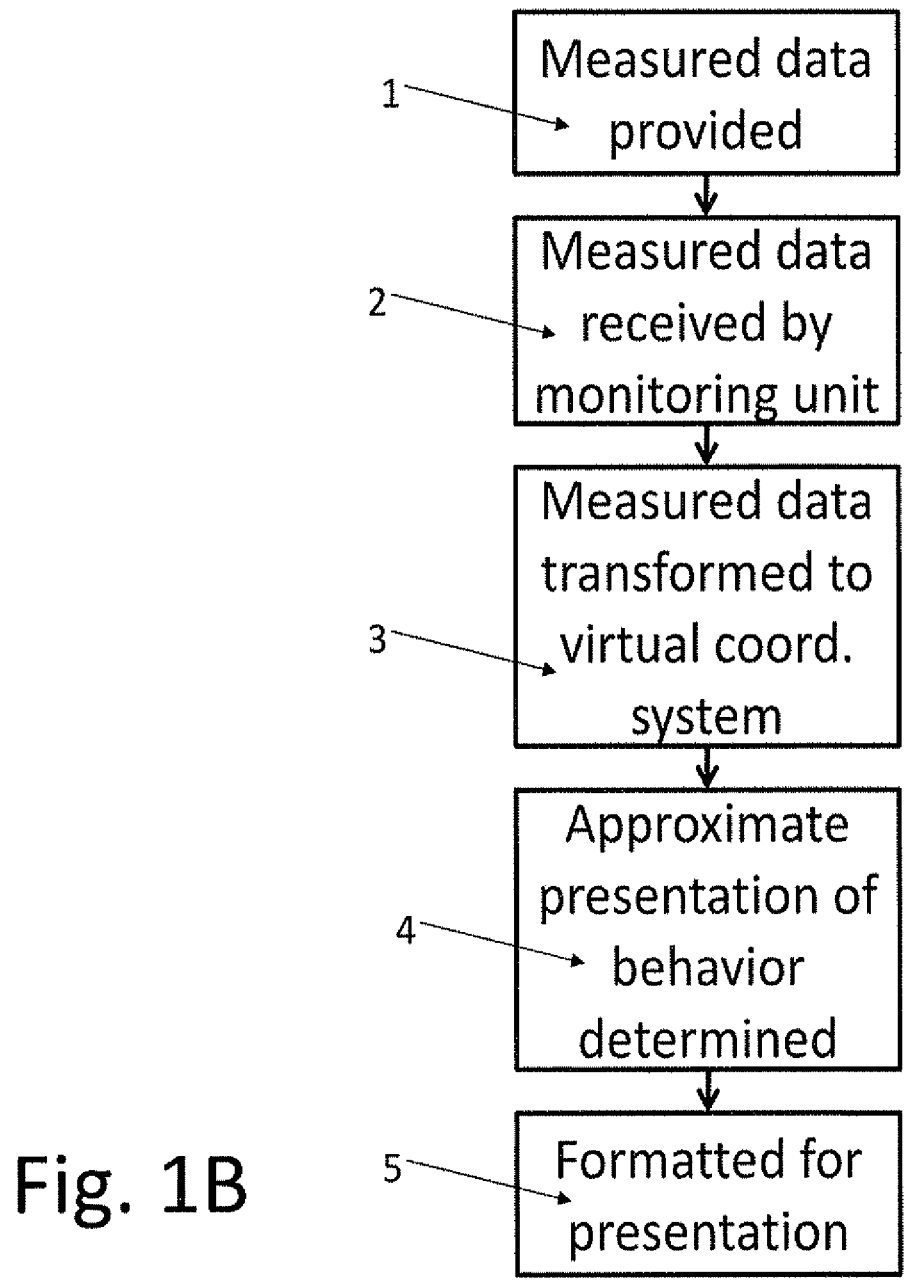
FIG. 1B shows a flow chart of a monitoring method carried out by the monitoring unit of FIG. 1A.

Reference is made to FIG. 1B, illustrating a method carried out by the monitoring unit 10 according to the invention. Measured data 16 indicative of a behavior of a physical object with respect to a certain proximity sensor matrix is provided (step I). The processor 14 is configured and operable to be responsive to the measured data 16 from the data input module 12. To this end, the processor 14 is linked to the module 12, typically by a wire, but generally this may be implemented using wireless connection, e.g. via IR, RF, Bluetooth or acoustic signal transmission. Thus, the measured data is received by the processor 14 of the monitoring unit (step II). As will be described below, the monitoring unit 10 may be integral with the proximity sensor matrix, or with a remote electronic device where the object's behavior is to be presented. The processor 14 operates to process the measured data, e.g. in a digital format (step III). The processor 14 includes a transformation module 18 preprogrammed for transforming the measured data 16 corresponding to the predetermined first coordinate system into an approximate representation of the physical object (or at least a portion thereof) in a predetermined second (virtual) coordinate system, and generate data indicative of such approximate representation (step IV). The transformation is such as to maintain a positional relationship between virtual points in the second coordinate system and corresponding locations/points the object (at least a part/portion thereof) as detected in the first (physical) coordinate system. It should be understood the approximate representation of the physical object corresponds to the object's behavior, namely object's position, a change in the position, motion of the object or its portion, etc.

The signal processor 14 generates output data 20 corresponding to said approximate representation of the physical object. The output data 20 is formatted in a manner to enable data linking of the monitoring unit to an electronic device configured to be responsive to such data, e.g. for displaying the data.

The monitoring unit may be a part of an electronic device including a proximity sensor matrix, in which the output data 20 is formatted for wireless signal transmission to a remotely located electronic device responsive to the object's behavior; or may be part of such electronic device responsive to the object's behavior, in which case it is configured to receive data from a remote proximity sensor matrix. In other words, the monitoring may be configured to monitor the object's behavior at a location where the behavior is originated or at the receiving remotely from said location.

Figure 2A:
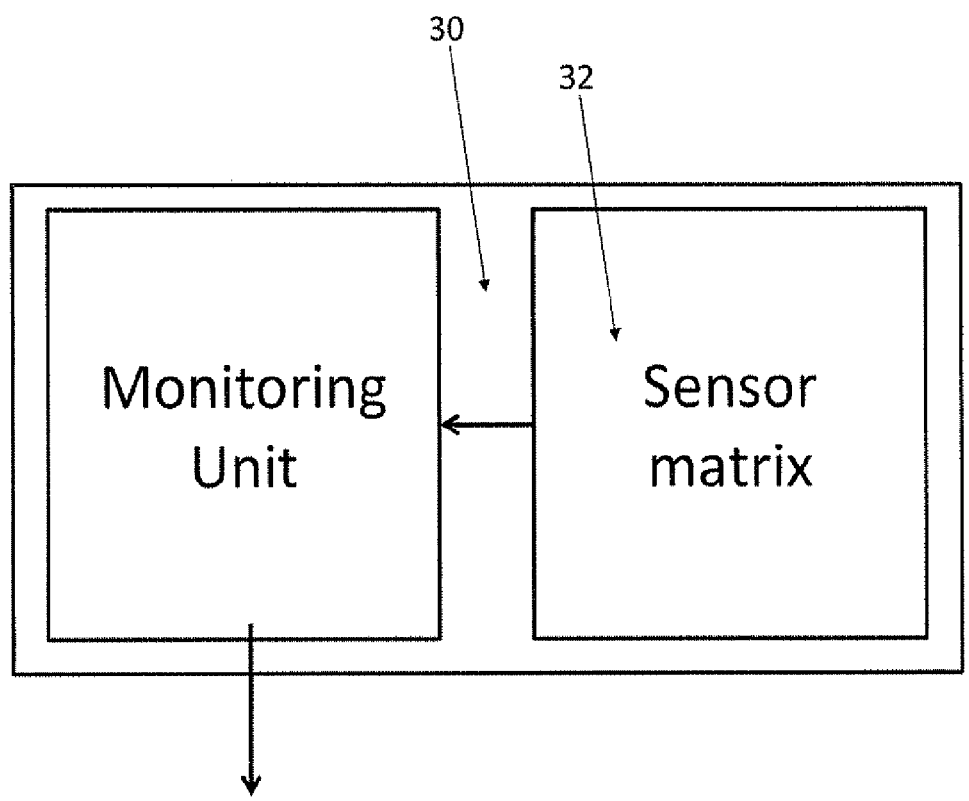
FIG. 2A illustrates a block diagram of an example of a device of the invention, where the monitoring unit of FIG. 1A is incorporated within a portable electronic device capable for sensing the object's behavior in the vicinity of the object.
Figure 2B:
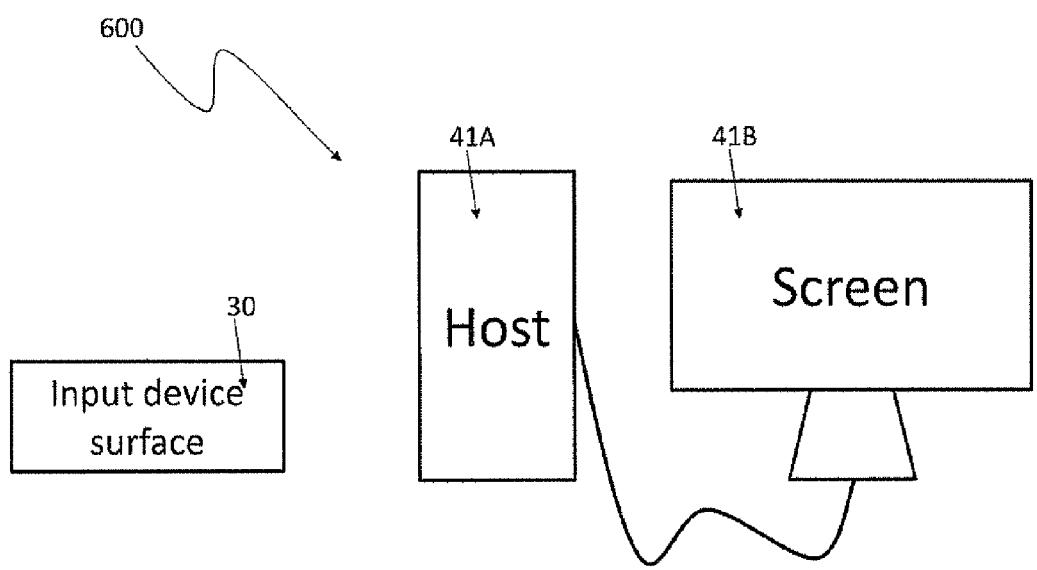
FIG. 2B is a block diagram of a system of the invention for monitoring/tracking the object's behavior remotely from the location where this behavior is originated.
Figure 3:
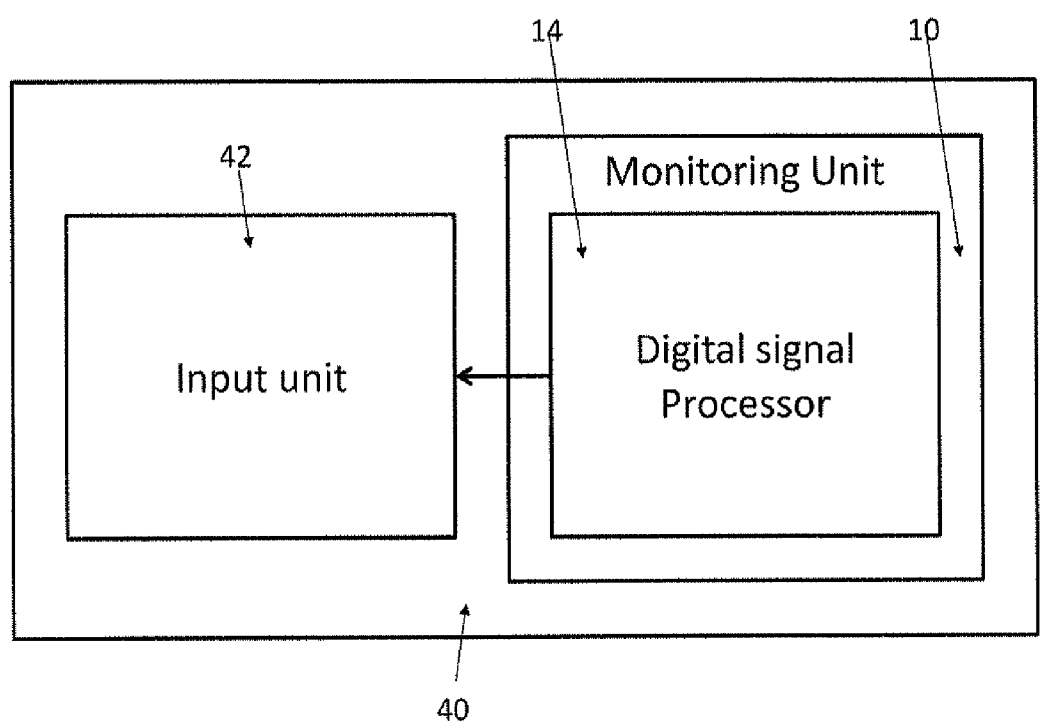
FIG. 3 illustrates an example of an electronic device utilizing the invention, where the monitoring unit of FIG. 1A is incorporated in the device to be controlled/operated by the object's behavior remotely from the object.

The above is more specifically illustrated, by way of block diagrams in FIGS. 2A, 2B and 3.

FIG. 2A exemplifies a device 30 of the present invention for use in monitoring a behavior of a physical object remotely from the object. The device 30 includes the above-described monitoring unit 10 and a proximity sensor matrix 32 which are made integral with one another. The device 30 may be a portable (e.g. hand-held) electronic device of a kind used for controlling an operation of another electronic device. For example the device suitable for incorporating the present invention therein is a phone device (mobile phone), remote control unit, etc. The device to be controlled may be a TV set, a host computer, etc. This is illustrated in FIG. 2B showing a system, generally designated 600 formed by an input device 30 configured as described above and intended to operate in the vicinity of the object to be monitored, and a host electronic system 40. In the present example, the host system 40 is constituted by a computer device 41A and a display unit 41B connectable to the computer.

The system 600 operates in the following manner: The proximity sensor matrix (32 in FIG. 2A) of the device 30 operates to track the object's movement (i.e. monitor the object's behavior) relative to the sensor matrix (i.e. a sensing surface defined by the sensing unit 32) and generates sensing data (measured data) indicative thereof. It should be noted that the sensor matrix can be actuated for tracking by preliminary identification of that the motion to be tracked is indeed associated with a specific physical object whose behavior is to be monitored (e.g. specific user's identification). This actuation can for example be initiated by the user. Alternatively, the sensing data may undergo initial processing to disregard "noise" measurement and select the measured data to be further considered as that associated with the specific object. For example, the sensor matrix performs height measurements and allows recognition of the user's finger tip location(s) and/or their respective from the sensor matrix (sensing surface). The monitoring unit (10 in FIGS. 1 and 2A) in the device 30 generates measured data in an appropriate format for wireless transmission to the host computer 41A. Thus, the user' related behavior information (data) is transmitted to the host system 41A which responds to the received information and in turn properly operates the screen 41B to display (present an image) this motion or operates certain appliance in the host computer in accordance with the user's behavior. For the purposes of the invention, the host computer is installed with a receiving utility/module (software and/or hardware) which is responsive to the measured data and is capable of identifying this data as if it was directly entered to the host via its conventional data input ports.

It should be noted that the sensor matrix is associated with an actuator (not shown) which is coupled to or associated with an AC power source. The AC power is intended to operate with a certain frequency or frequency range. The actuator is configured and operable to identify "noise" energy being in the same or overlapping frequency range and being originated by an external energy source. Upon identifying such a condition (existence of the noise energy), the actuator either prevents operation of the sensor matrix or preferably operates to shift the operative frequency of the AC power source.

It should also be noted, although not specifically shown, that the device may include a transmitter of the kind capable of receiving output of the processor and convert it into an appropriate transmission media, e.g. for wireless signal transmission, such as IR, RF, Bluetooth, acoustic media.

It should also be noted, although not specifically shown, that the device may include a formatter utility which is connected to the output of the processor or that of the transmitter, as the case may be. The formatter is preprogrammed to convert the received data into a predetermined format which is that of data input format of an input device used at the remote location where said approximate representation of the object's behavior is to be applied (e.g. displayed).

As indicated above, the monitoring unit can be part of the host system. This is shown schematically in FIG. 3 which illustrates an electronic device 40 (constituting host system 9 intended to be controlled/operated in accordance with the behavior of an object or to and/or display such behavior remotely from the sensor matrix detecting this behavior. The sensor matrix in this case can be conveniently positioned in accordance with the user's preference. The device 40 includes the monitoring unit 10 and a data input unit 42 configured to define said second (virtual) coordinate system. The data input unit 42 is typically linked to output of the processor 14 for receiving said approximate representation. Device 40 can be a part of a display system and a computer based system which is suitable for being operated remotely e.g. media center, home cinema equipment etc.

It should be understood, although not specifically illustrated, that the case may be such that the device 40 is equipped with a receiver unit of the kind capable of converting incoming data of the wireless-type media into the appropriate input to the signal processor. Also, device 40 might be equipped with the above described formatter utility preprogrammed in accordance with the input unit 42 of the device 40.

The present invention provides for detecting and tracking the behavior of at least a part of the object, e.g. user's multiple fingers, in 3D coordinate system, and a virtual representation of the detected fingers as displayed on a distant screen on top of the original image, thereby simulating touch-screen experience on a remote screen (e.g. activating buttons, applying gestures). Generally, touch experience on touch-screen includes the following components: The user finger-tip lands from hover while the user fixes its path towards the target location (e.g. virtual object such as buttons on the touch screen); this process maintains eye to finger tip to target coordination; and physical feedback at the finger tip (touch feeling or even vibration) from the surface is provided when the user touches it.

These components can be maintained in the system of the invention, for example in the following way: The finger-tip is sensed (and its location in 3D space is calculated) while hovering above the sensor surface and its representation (e.g. cursor) shape indicates for its three-dimensional position with respect to the sensor surface. For example, the height of the finger tip above the sensor (z-axis) is indicated by the cursor size, and the smaller the cursor, the closer is the finger to the surface. Also the finger tip (x,y) location, with respect to the sensor, matches its cursor position, in respect to the screen (or the active part of the screen). Thus, for example, when the finger-tip is at some point above the middle of the sensor, its correspondent cursor is in the middle of the screen. This allows the user to target (still without activating) a virtual object on the screen, and to activate (or drag, rotate, etc) it when the finger-tip representation reached the object location, and the finger tip has moved from hover to touching the sensor. The physical feedback is sensed when the finger-tip touches the sensor, as occurs in touch-screen. Thus, the three-dimensional sensing combined with the three-dimensional representation on the remote screen, allows for targeting remote virtual objects in hover, and for their activation (or any other action, e.g. dragging) upon touching the sensor at a sensor point corresponding to a screen point included or near the virtual object (i.e. the same point when the sensor surface is theoretically stretched (or projected) on the screen surface), i.e. the top left point of the sensor corresponds to the top left corner of the screen and the middle of the sensor is the middle of the screen). Optionally, the touch activation is performed when the finger-tip is at height which is higher than zero (still hovering).

The following are some example of the above-described 3D monitoring of the user's behavior enabling its presentation on a remote screen.

Figure 4:
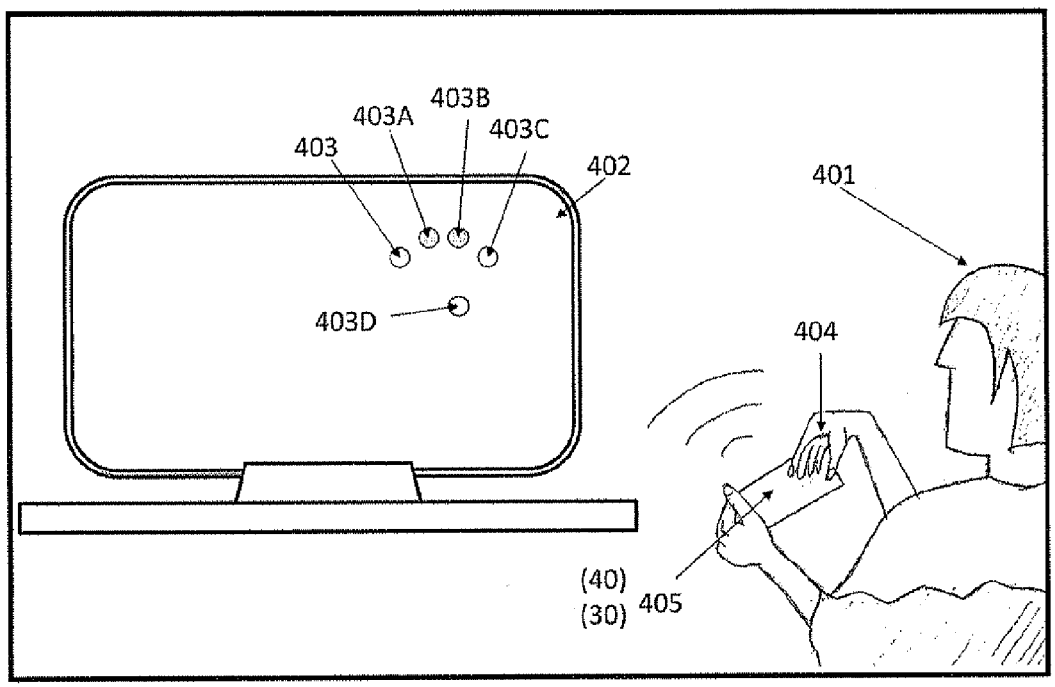
FIG. 4 is an illustration of an embodiment of the system of the present invention utilizing displaying the object's behavior at a location remote from the object.

Reference is now made to FIG. 4 exemplifying a technique utilizing the principles of the present invention for displaying data indicative of the approximate representation of the motion of user's fingers. An exemplary user thus operates a system of the present invention for displaying data indicative of said approximate representation. The system is configured generally as the above described system 600 formed by a handheld device incorporating a sensor matrix and wireless connectable to a external computer device (e.g. display device), where the monitoring unit of the present invention is incorporated in either the handheld device or is associated with (incorporated in or coupled to) the display device. Thus, the device incorporating the monitoring unit may be the handheld device 30 or the display device 40.

The user can hold in one hand the device while his other hand/fingers is/are positioned above the handheld device 30 in either touch, hover or distant locations. Finger tips, for example, are detected by the sensor matrix (not shown) in the handheld device 30 and transformed measured data (formatted to be displayed) indicative of their behavior is transmitted to the remote screen device 40, or the measured data (raw data) is transmitted to the screen where it is transformed into the display format. In the figure, spots 403, 403A, 403E, 403C and 403D displayed on the screen correspond to the finger tips of the user at a certain position relative to the sensor matrix (sensing surface 405) of device 30. By way of non-limiting example, spot's color and/or brightness indicates the absolute or relative height of the corresponding finger tip. Thus, the user's hand or fingers behavior can be approximately represented on the screen and motion of the hand/fingers can be tracked (or generally, the behavior can be monitored) remotely from the hand/fingers location due to appropriate sensing and motion data transformation. The latter is such that the approximate representation on the remote surface/space maintains the positional relationship between respective portion of the user's hand as well as with respect to the sensing pad. The spots can be tracked to detect gestures or perform selection and alike.

The application is optionally a computer based system (or host) such as media center, video games console or regular PC to which a stationary display 402 (in most cases—relatively large) is connected and optionally placed in a relatively distant range from the user 401 who interacts with the system using his fingers 404 over the device surface 405 that can detect multiple fingers from a distant height, and transmit, for example, the behavior of the user's fingers, palm, hand or any portion thereof. By way of an example, display 402 provides an approximate representation of the user's hand. The representation includes 5 portions of the user's hand, namely, finger tips representation 403, 403A-D. Optionally, each portion being represented is uniquely identified by a visual indication such as color, shape, silhouette or pattern and like or any combination thereof. In addition, distance of one or more portions can be indicated by color, shape, silhouette or pattern and like or any combination thereof. The behavior of the fingers can include the position of the finger tips in 3D coordinates of in a vector space, the respective heights of the finger tips (or palm etc), identified gestures (including motion gestures in 3D space), height map image representation, relative positioning of user's fingers may include perspective view of the monitored fingers.

For example, FIG. 4 illustrates that several portions of the user's hand are closer to the proximity sensor matrix in comparison to the other portions. In this example, the middle finger portions 403*a* and 403*b* are being indicated as closer to the proximity sensor matrix by darker color indications.

The monitored behavior can also include relative positioning of other portions of the user's hand. The behavior of the fingers can be transmitted to the host which, in one embodiment, displays the received behavior. A dedicated module that is executed on the host can display the behavior of the physical object such as the finger portions overlaying of an original image in a way that enables the user to see the original image beneath and use behavior information of each finger for the purpose of user interaction and control. For example, semitransparent display of the behavior of the user's finger tips over an original image of the screen can be envisaged in this respect. In one embodiment, the devices or systems of the present invention wirelessly transmits the fingers behavior to the computer based system. Either wired or wireless proximity sensor surface is also included in the scope of this invention. The host can optionally be communication with the computer based system.

Rather than mere identification of a touch of a finger tip (or hover detection of a very close proximity), the present invention provides transformation of a behavior of the user's hand into an approximate representation of the user's hand or any part thereof in a coordinate space possibly 3D space which improves the conventional control apparatus in the living room scenario, for example, to a new level of agronomic engineering and design.

The detected fingers and hands may also be monitored (or e.g. displayed while being in a substantial distance from the sensing surface 405 as multiple symbols 403 or images on top of a displayed image. The distance may range from 0 to 3 cm, 1 to 4 cm, 1 to 5 cm, 2 to 5 cm, 2 to 6 cm, and 3 to 7. The devices of the present invention and the sensing surface 405 may activate a virtual object, buttons or features of any shape, dimension, orientation or pattern which can be optionally displayed. Thus, one or more portions of a physical object, such as finger, can be displayed or represented, in an approximated representation, that can be located above the virtual object, button or feature, in either a touch or touchless mode (zero proximity to sensing surface). In addition, monitoring the behavior or a physical object including contact and contact-less or distant movement can be used to drag, move, manipulate (by gesturing), zoom in and out, 3D rotation, and panning in all directions those virtual objects that are displayed on the display screen. In this respect, the term "touch" and "hover" are used inter changeably with "contact" and "contact-less", respectively. In some embodiments, the drag, move, manipulation, gesturing and other feature can be monitored in a 3D coordinate system. In addition, predefined gestures with the hand can be used for to selecting predefined or programmed actions. These may or may not be oriented to a specific displayed object.

Visual, audio and sensual feedbacks are used to indicate behavior of an object and any portions thereof; the feedbacks can indicate detection of touch or non-touch manipulations, hovering behavior, distant behavior, dragging, gesturing and alike.

Another possible way to approximately represent portions(s) of physical objects such as user's hands and/or finger(s) can utilize silhouette, the relative position and/or shape of which is adaptive in correspondence with the behavior of the physical object being monitored. Optionally, the size of the representation can be increased or reduced as the physical object being monitored becomes closer or is drawn away from the sensing surface.

In accordance with the present invention, transformation maintains a positional relationship between virtual points (those used at the remote from the object location) and corresponding view points of the portions of the physical object as sensed in the vicinity of the object. Thus, yet another possible implementation can utilize shapes, sizes or other effects (visual or otherwise) to provide an object representation maintaining relative positioning of portion(s) of the physical object which is being monitored.

It should be noted that the present invention is not limited to a particular number of points (either view points or virtual points). Generally, this may be defined by a number of sensors in the sensor matrix, or possibly also by an appropriate interpolation algorithm (this increasing the number of points).

In some embodiments, the positional relationship includes a distance from the corresponding portions of the physical objects to the sensing surface. Alternatively or additionally, the positional relationship includes the distance between two or more corresponding portions of the physical object being monitored. In other words, the positional relationship includes the spatial (volumetric) arrangement of the corresponding portions of the physical object (perspective) and a corresponding arrangement of the virtual points. The positional relationship can also be indicative of any of the following: (1) which portion(s) of the physical object is/are the closest to the proximity sensor matrix; (2) which portion(s) of the physical object is/are the farthest to the proximity sensor matrix; (3) comparative data indicating of a plurality of the corresponding portions of the physical object that are the closest neighbors between to them. It should be understood that the sensor matrix is capable of producing measured data that can be processed to obtain a 3D representation, thus allowing depth perception of at least a portion of the physical object.

In some embodiments, the processor of the monitoring unit is preprogrammed for assigning the portion(s) of the physical object with a representative geometry, shape, pattern and/or indicia. These can have position (3D) in a virtual coordinate system.

The approximate representation may utilize projection of the virtual points onto a predetermined pattern (a so-called "original image") appearing on a projection surface (e.g. display). The predetermined pattern can vary between different applications of the invention. For example, the user's hand can be represented in approximation as a specialized cursor having two different symbols or shapes (or otherwise visual effects) with respect to the behavior of the user's hand including touch, hover, 3D gestures, rotation etc. The specialized curser or other representation can reflect distance of a portion of the user's hand from the sensing surface. The representation can take the form of a visual effect characteristic of a distance, perspective, orientation, segmentation of the monitored object. For Example, hovering object can be displayed as an object in a lighten image that becomes lighter and lighter as it becomes closer and closer to the sensing surface. The lighting effect can be continuous or step-wise changes in light intensity.

Another possible method can utilize adaptive shapes and/or sizes that become smaller and smaller as the object gets closer and closer to the surface (and vise-a-versa). The present invention therefore provides improved targeting of specialized curser to a virtual feature or point.

Figure 5A:
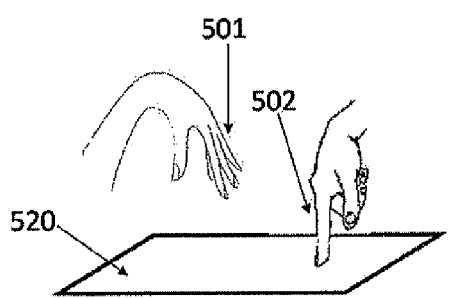
FIGS. 5A to 5D exemplify some features of the invention showing how the invention can be used for remotely tracking the object's behavior.
Figure 5C:
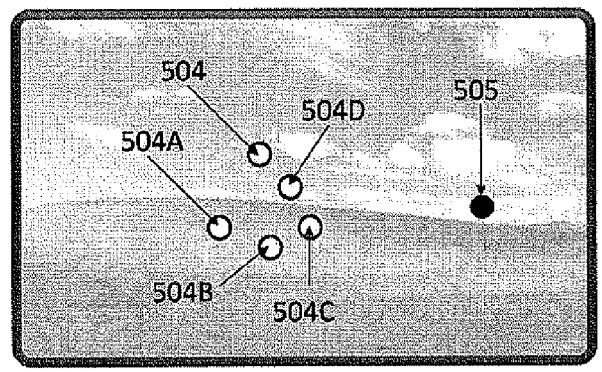
Figure 5B:
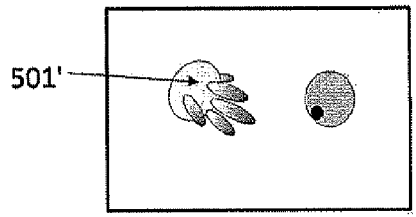
Figure 5D:
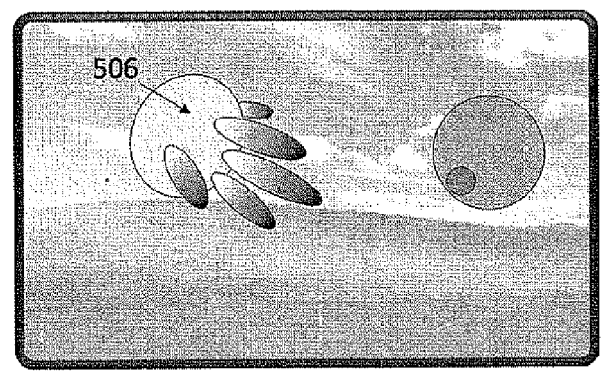

Reference is now made to FIGS. 5A to 5D exemplifying the technique suitable to be used in the present invention for generation of the sensed data and the corresponding transformation data or approximate representation. As shown in FIG. 5A, user's fingers 501 of one hand are positioned above a sensing surface 520, while that of the other hand 502 contacts (touches) the sensing surface 520. The finger portion 501 is located at a certain non-zero distance with respect to the sensing surface while finger portion 502 is located at the zero distance, FIG. 5B shows a height map image data corresponding to measured data generated by the sensor matrix, Different height values can be indicated by brightness variations of the points, generally at 501', of the object at the sensing surface 520. The data shown in FIG. 5B thus corresponds to the 3D measured data obtained by proximity measurements using a proximity sensor matrix. This data is then transformed to approximate representation of the physical object being monitored. As indicated above, such transformation is carried out by the processor being either at the proximity matrix side or at the remote display side. As shown in FIGS. 5C and 5D, the calculated finger tips locations (transformation results) are presented on the remote screen. In FIG. 5C, this presentation utilizes different colors (gray level or transparency level) to illustrate virtual points corresponding to object's portions in the 3D space (different height values) with respect to the sensing surface and thus with respect to the screen. Here, the approximate representation of the object is carried out on top of a predetermined pattern (background indicia) using semi-transparent symbols 504, 504a-d and 505. This visual technique can be for better targeting and controlling of a virtual feature or object where minimal graphical interference to predetermined pattern is required. The transparency level may indicate the height/proximity. By way of non-limiting example, as hand 502 is closer than hand 501 to the sensing surface 520, its respective symbol 505 (representing the finger tip portion) is less transparent than symbols 504 which represent finger portions of hand 501. FIG. 5D exemplifies another possible display technique for displaying the approximate representation of the measured data corresponding to that shown in FIG. 5B. Here, a perspective image 506 is stretched and interposed with the original screen image (background indicia). The positional relationship of the virtual points in the displayed (transformed) data 506 corresponds to the positional relationship between the object's portions/points (i.e. real fingers and other hand portions in the present example) in vicinity of the sensing surface.

It should be noted that the present invention can be used in various applications. For example, the invention can be used to approximately represent the physical object in a virtual domain (or virtual coordinate system) and use this representation to control and optionally manipulate virtual objects. In some other examples, the invented technique can be used to implement keyboards using virtual displayed keypads; as well as to activate features using either single- or multi-touch gestures, writing/sketching pad, 3D gestures device that can be used for activation and control, gestures configured for recognition of a specific part/portion of a physical object (e.g. finger(s) of user's hand).

Figures 5E, 5F:
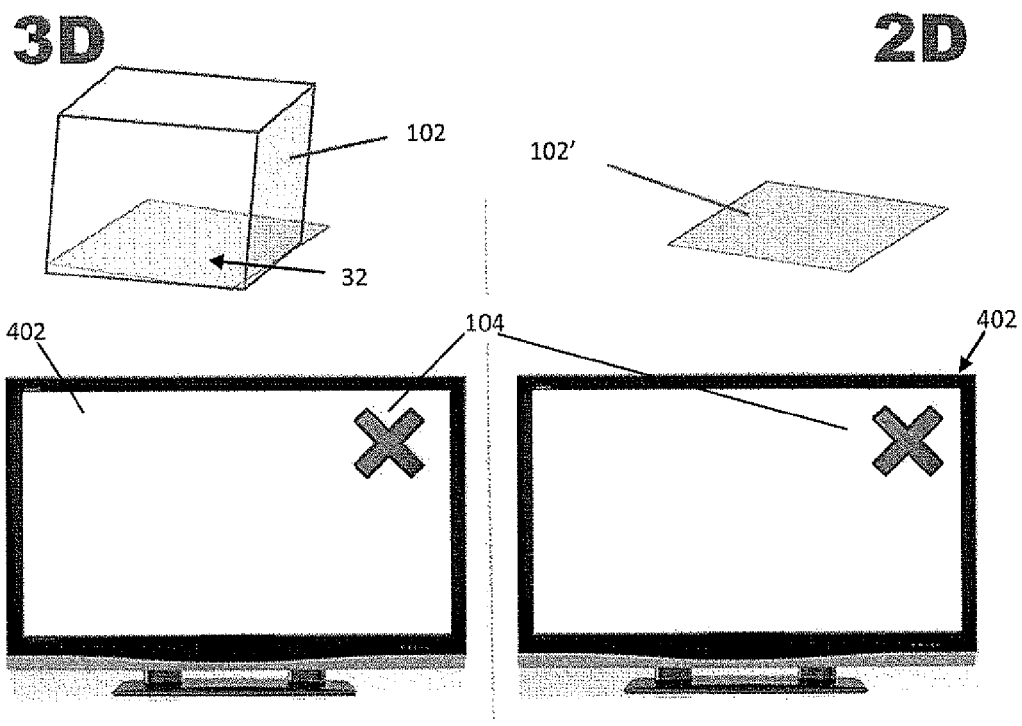
FIGS. 5E to 5L exemplify an embodiment of the invention showing an effect of simulating touch-screen experience on a remote screen, as compared to the two-dimensional sensing and representation.
Figures 5G, 5H:
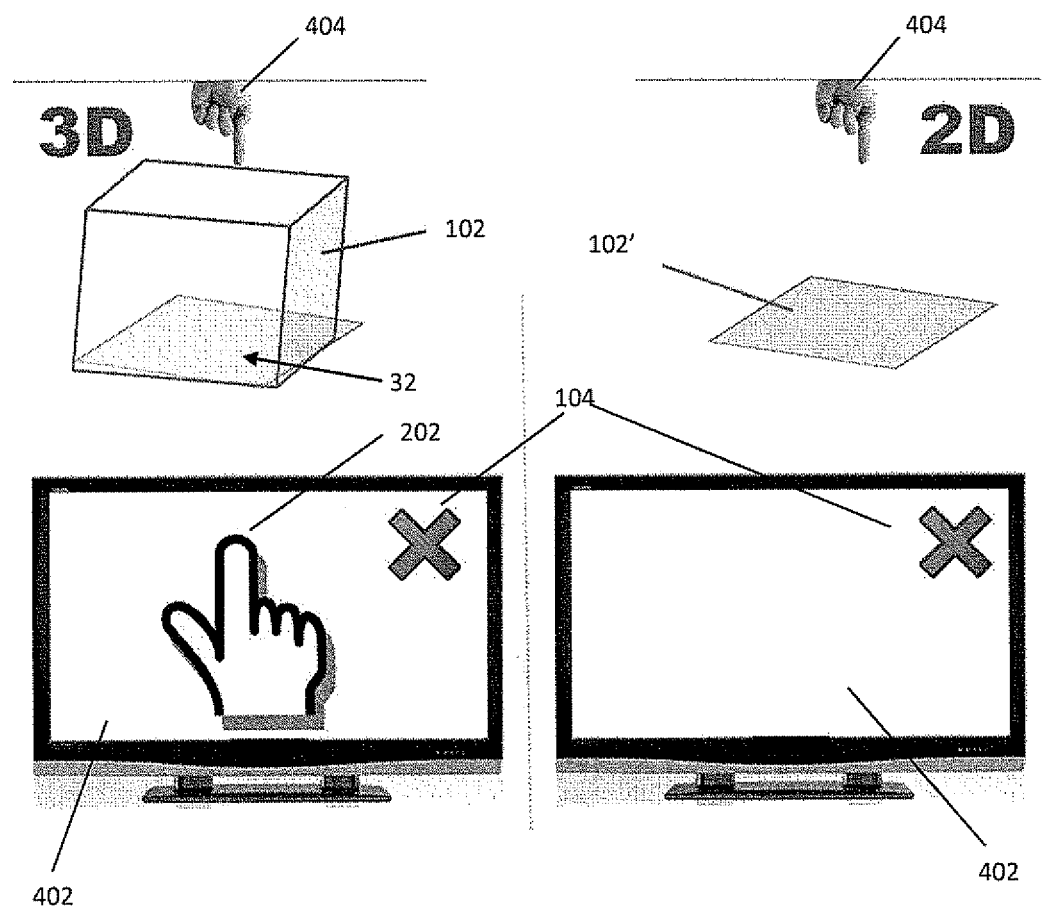
Figures 5I, 5J:
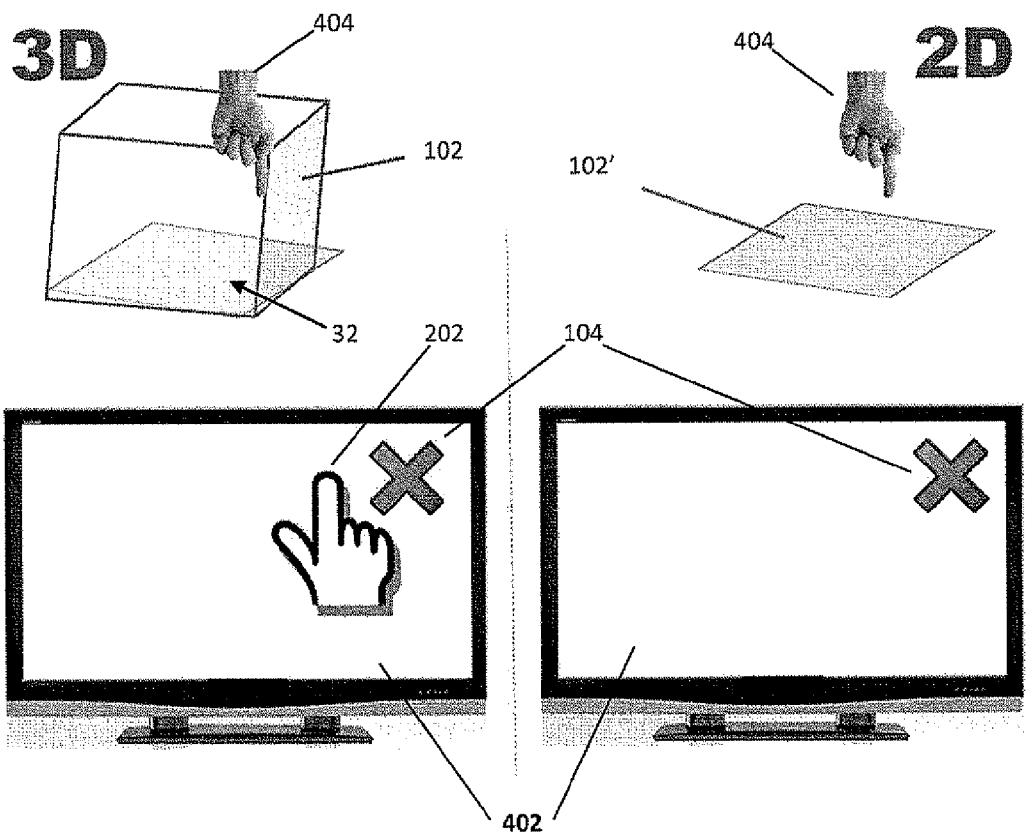
Figures 5K, 5L:
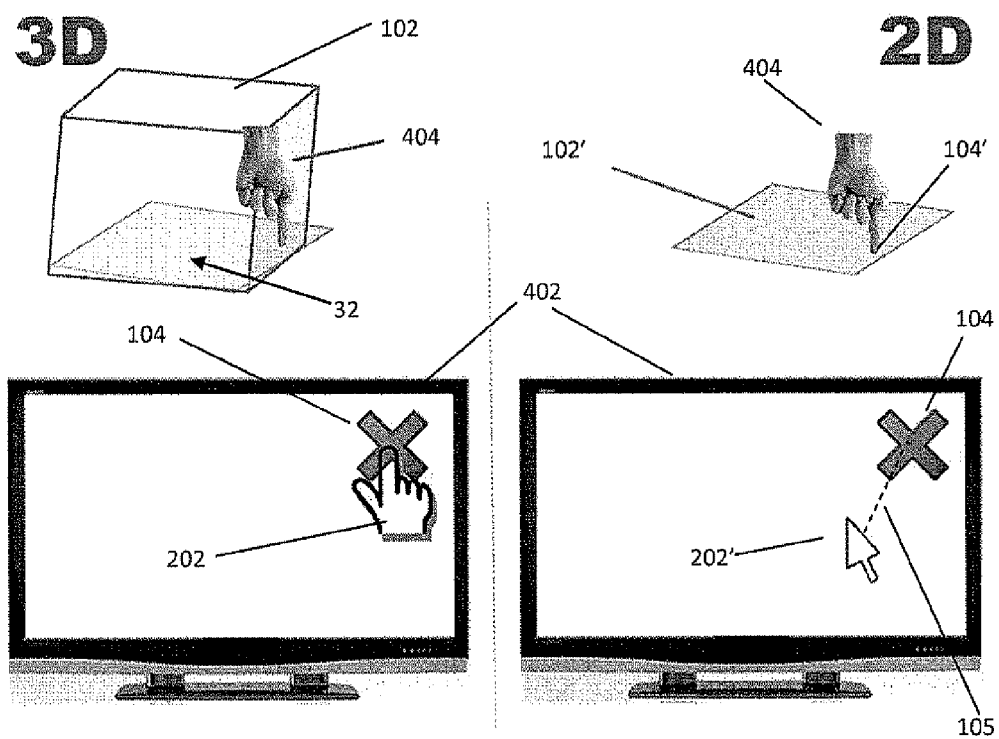

FIGS. 5E-5L, demonstrate differences in the above-described technique of the invention for simulating touch-screen experience on a remote screen enabled when using three dimensional sensing and representation (FIGS. 5E, 5G, 5I, 5K), versus the touch experience enabled with the existing two-dimensional sensing and representation, e.g. touch-pad (FIGS. 5F, 5F, 5J, 5L). These figures exemplify a "target and activate" technique.

As shown in FIGS. 5E, 5G, 5I, 5K, a sensing matrix located in a sensor matrix located in a sensor surface 32 defines a sensing region/area 102 of a cubic geometry. As for a two dimensional sensing and representation system exemplified in FIGS. 5F, 5H, 5J, 5L, here a sensing area 102' is that of a planar sensing surface.

As illustrated in FIGS. 5E and 5F, in both cases, a user intends to target a symbol "X" designated 104 on a remote screen 402 while holding or operating in the vicinity of the sensor 32 and sensor 102' and looking on the remote screen. FIGS. 5G and 5F, FIGS. 5I and 5J, FIGS. 6K and 5I, show three successive stages respectively during the user's hand movement towards the sensor 32 and 102'.

As shown in FIGS. 5G and 5I1, a user's hand 404 is approaching the sensors surfaces 32 and 102'. In the example of FIG. 5G (3D sensing and representation), once the user's hand enters the cubic sensing space 102 above the sensor surface 32, a representation 202 of a three dimensional position of the hand appears on the remote screen 402. For example, a size of the representation 202 corresponds to the distance/height of the hand above the sensor (z-axis position), and a two-dimensional position (x-y plane position) of the representation 202 within the remote screen surface corresponds to two-dimensional position (x,y) of the user's hand in the sensor surface 32. For example, when the hand is above the top left corner of the sensor, the hand's representation appears at the top left corner of the screen, and when the hand is above the central region of the sensor, the representation is at the center of the screen. As seen in FIG. 5I1, movement of the user's hand with respect to the sensor surface has no representation on the remote screen 402 because the hand is outside the sensing area of sensor 102'.

FIGS. 5I and 5J correspond to a further position of the user's hand towards the target on the sensor. In the example of FIG. 5I, the user is getting a visual feedback of his hand movement in the sensing area 102 with respect to the sensor 32 from a change in the representation 202 on the remote screen 402, before touching the targeted location on the sensor. This allows the user to appropriately manipulate his hand to create a path in the cubic space 102, which leads representation 202 directly towards the target 104, Here, the height (z-position) of the hand 404 above the sensor 32 is represented by the size of representation 202 on the screen 402. Since the hand in this position is closer to sensor 32, as compared to that of FIG. 5G, the representation 202 has a different size, e.g. smaller. In the example of FIG. 5J, corresponding to 2D sensing technique, still nothing appears on the remote screen 402, because the user's hand 404 is outside the sensing area of sensor 102'. Thus, the user hand 404 blindly approaches the sensor towards an arbitrary point.

In FIG. 5K, the user hand 404 has completed its three-dimensional path, leading the hand representation 202 at the target 104 on the remote screen 402. Touching the respective location on the sensor 32, can now trigger a certain action (e.g. activating, dragging etc.). Thus, the user's hand movement through steps illustrated in FIGS. 5E, 5G, 5I and 5K simulates touch experience on a regular touch-screen where the user hand is located near the touch-screen. Also, the end of the targeting path is sensed with a physical feedback of touching from the sensor, which can trigger an action.

In FIG. 5L, the user hand 404 has completed its blind journey and touches the sensor at some arbitrary point 104'. Only now a two dimensional representation 202' appears on the screen, and the user has to continue dragging his hand on the sensing surface 102' to move the representation 104' along a path 105 to the target 104. Then, in order to perform a certain action (e.g. activating, dragging etc.), another action will be needed (e.g. waiting on the point, gesture as tapping or changing direction) to notify that the target has already been reached and now an action is required.

The area and perspective in the virtual coordinate space or the display which reflects the approximate representation of the physical object behavior can be dynamically adapted according to a specific application. For example, when used to move a cursor, the display can be used to reflect an approximate representation of the physical object being monitored. Optionally, when used for typing on virtual 3D keyboard, the display can reflect the representation of the object in relative relationship with the virtual keyboard. It should be noted that the technology used in the input device in which the sensor matrix is incorporated and which defines the sensing surface may be of any known suitable type. The sensor matrix together with its built-in or coupled to processor utilizes appropriate processing utilities (hardware and algorithm) to obtain the proximity/height measurement or map image as described. The sensor matrix may utilize capacitive proximity sensing surface. In this case, the matrix is formed by an array (e.g. 2D array) of sensor pads.

Capacitive proximity sensor matrix is capable of providing the Z dimension (proximity/distance measurement) as well as position along the matrix plane (X,Y) or sensing surface. Capacitive methods are widely used in various applications, especially in those where the position/motion is to be tracked under extreme environmental conditions such as lighting destructions, mechanical stress etc. The principles of capacitive methods are known per se and do not form a part of the present invention. Such methods can advantageously be used in handheld input device of the present invention due to the fact they enable the device to be simple and compact, as well as cost effective.

Figure 6A:
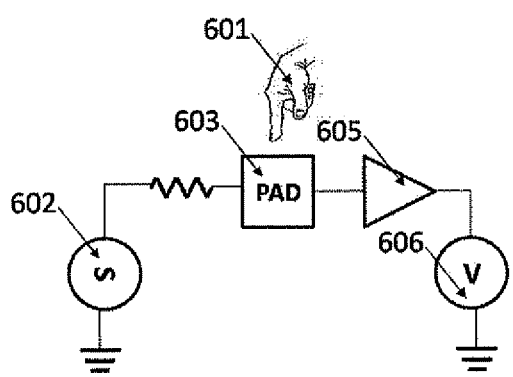
FIGS. 6A to 6E illustrate four embodiments of the present invention utilizing capacitive touch sensing pad, where

The capacitive sensor based sensing surfaces exploit the physical body ability to effect a change in the capacitance of an electrical circuit. In this connection, reference is made to FIGS. 6A-6D. FIG. 6A illustrates a sensing pad 603 of the sensor matrix and its associated electrical circuit. As shown in FIG. 6B, pad 603, which is made of electrically conductive material, presents one of the two plates of a capacitor 604. The pad 603 is placed at a known 2D location in the X-Y sensing surface defined by the proximity sensing matrix.

When user's finger 601 is brought closer to the pad 603, it creates a plates-capacitor to the ground. The closer the finger to the sensing pad 603, the greater the equivalent capacitance measured on 604. A power source 602, which is electrically connected to the sensing pad 603, may be an AC voltage source. The greater the equivalent capacitance, the lesser the impedance it exerts. Thus, the magnitude of the measured AC signal (i.e. output of amplifier 605) decreases as well. Alternatively, the power source may be a DC current source. The greater the equivalent capacitance, the lesser the potential measured at the end of a fixed charge period. As exemplified in FIG. 6D, optionally, the power source of the proximity sensor pad is attached to the user body (for example, when the user holds the proximity sensor surface, this attachment is assured). The closer the finger to the pad, the stronger the electric field at the pad, and thus the higher the voltage measurement increases. The circuit elements will be referenced with the same potential and thus the measurement sensitivity increases.

Figure 6C:
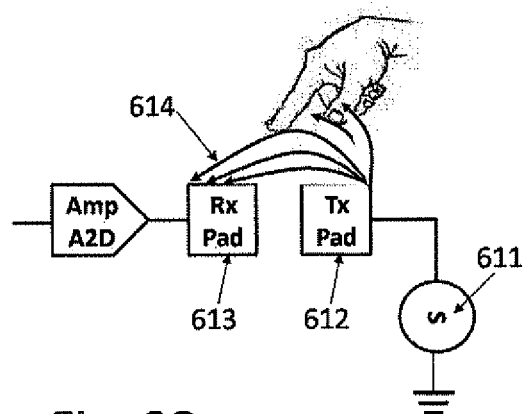
Figure 6B:
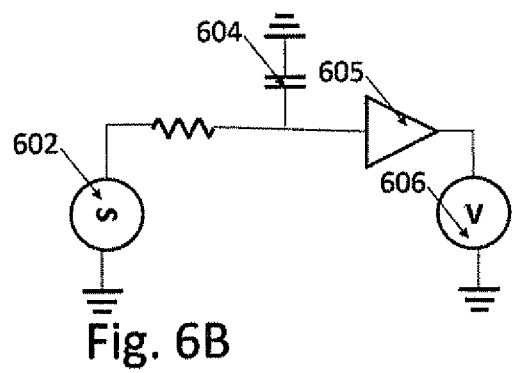
Figure 6D:
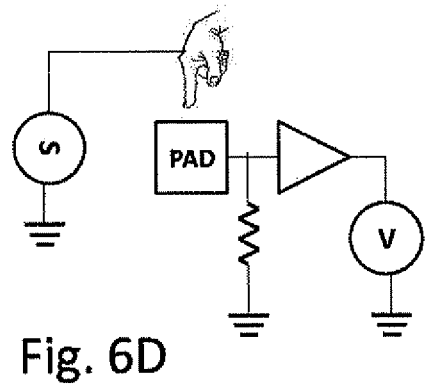

FIG. 6C corresponds to an example in which a technique known as "shunt capacitance" is used. An excitation (power) source 611 is connected to a transmitter pad 612 generating an electric field to a receiver pad 613. The electric field lines 614 measured at the receiver pad 613 are translated into voltage measurement. When a finger 615, or other grounded object, interferes with the electric field, some of the field lines are shunted to ground and do not reach the receiver pad. So the voltage measurement decreases.

Figure 6E:
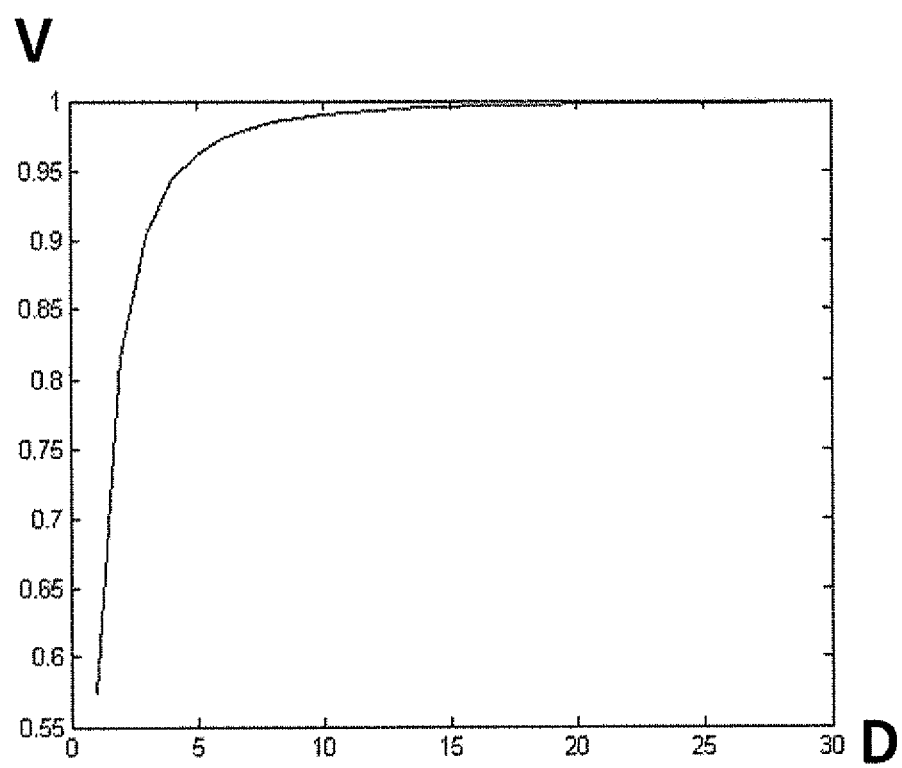

For each sensor matrix element (for each pad), a function describing dependence of the signal magnitude or potential versus on a distance/proximity from the sensing surface can generally be known, e.g. determined in a calibration procedure. An example of such function is illustrated in FIG. 6E. This example corresponds to the voltage versus height function, for the capacitive measurement, where the power source is an AC voltage source and the circuit parameters are as follows: the source frequency, F, is 400 KHz, the voltage, V, on the power source is 1V, a resistor, R, is 1 MOhm, the air dielectric constant, $\epsilon_0$, is 8.85e-12, the plates area, A, is 64 um, the distance d between the plates varies from 1 to 30 mm. The measured voltage on the capacitor, $V_{cap}$, is given by a voltage divider formula:

$$V_{cap} = V \cdot jX_c / (jX_c + R)$$

where $X_c$ is the capacitor impedance.

Using the plate capacitor formula, this can be developed to:

$$V_{cap} = V \cdot [d/\text{sqrt}(d^2 + (2\pi \cdot F \cdot R \cdot \epsilon_0 A)^2]$$

Thus, using the calibration curve for the measured signal as a function of distance/proximity, the distance of the physical object (e.g. finger portion of a hand) from the sensing pad can be concluded. With the AC voltage based configuration, the proximity of the physical object can be determined in accordance with a change in phase of the measured signal.

It should be noted that the affected capacitance can be a part of a low pass filter. The measured phase is a function of the equivalent capacitance, i.e. function of the height and proximities. If this configuration is used, the AC source phase has to be learned or deduced in order to calculate the phase shift. Optionally, both the phase and magnitude are used to calculate the height or proximity.

The first level or low level processing of the position data is aimed at obtaining the measured data (to undergo transformation) in the form of a so-called "height map image data". This can be done in a digital processing unit (DSP) at the sensor matrix unit or at said processor unit or computer module of the monitoring unit which also implements the transformation. As indicated above, the monitoring unit may be a part of the input device incorporating the sensor matrix as well, or may be part of the remote electronic device (e.g. display). The same or different DSPs may thus determine data indicative of the behavior of the physical object in the vicinity of and with respect to a proximity sensor matrix, generate measured data indicative thereof, and transform the measured into approximate representation in a virtual coordinate system. The approximate representation may or may not be the so-called "perspective" representation.

There are many possible arrangements for the sensing pads array suitable to be used for the purposes of the invention. However, for simplicity only a specific but not limiting example is described below.

Figure 7A:
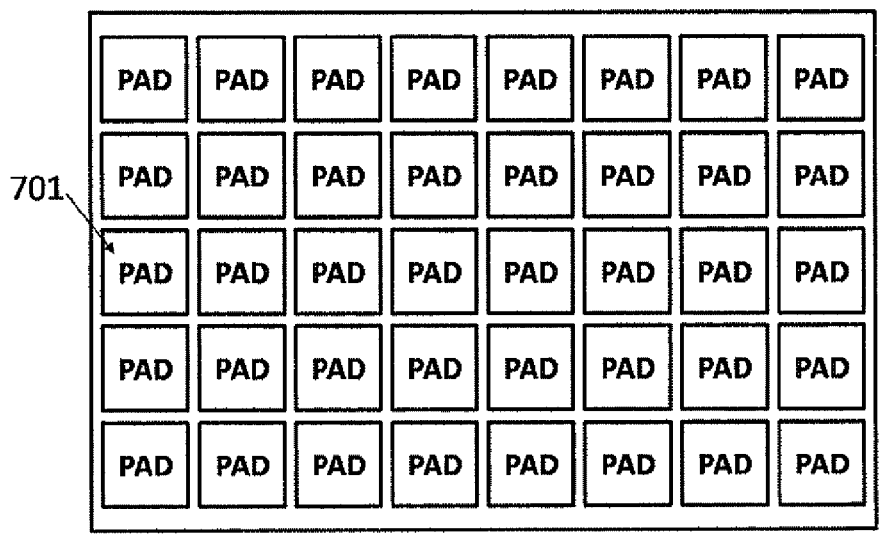
FIGS. 7A and 7B show an example of the arrangement of capacitive sensing pads (FIG. 7A), and an example of the electrical circuitry thereof (FIG. 7B).
Figure 7B:
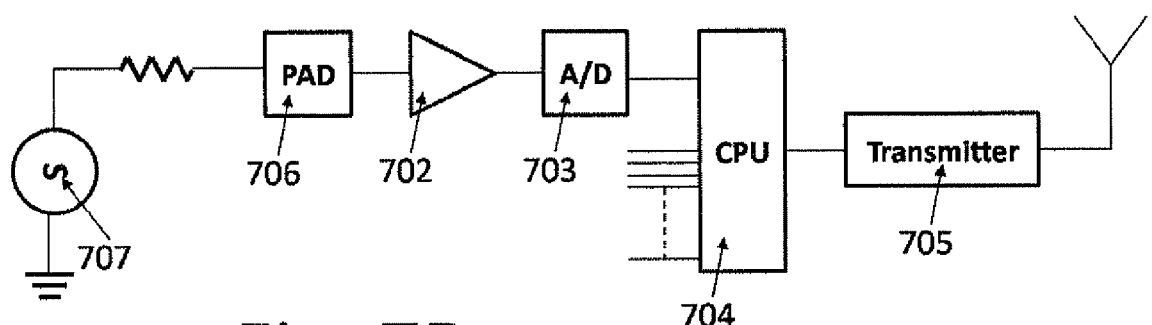

In this connection, reference is made to FIGS. 7A and 7B showing respectively a 2D sensor matrix arrangement 701 and related electrical circuit. Each sensing pad 706 has an analog amplifier 702. An AC power signal 707 is supplied to the electrical circuits. The amplifier output is sampled by an analog to digital converter 703, and the samples are transferred to a CPU 704, for further analysis. In some embodiment, the signal source (powering voltage signal) is produced by a sinus or square oscillator and a magnitude measurement is obtained by running Discrete Fourier Transformation (DFT) on the samples. DFT methodologies are known in the art and need not be described in details. In some other embodiments, the capacitance measurement is translated to a DC level by the hardware: the output of amplifier 702 is rectified and filtered to a DC level proportional to the output magnitude. This can be performed prior to the sampling procedure.

Optionally, the analog to digital converter 703 with several input channels can be used to support several amplifiers. The number of amplifiers needed in this example is defined by the surface area of the sensing surface. Optionally, several processors (CPUs) are used, each for a different surface region (different group of pads) of the device. Processing results are transmitted via transmitter 705.

Optionally, a capacitive to digital chip is used to estimate the capacitance associated with each sensing pad.

Figure 8A:
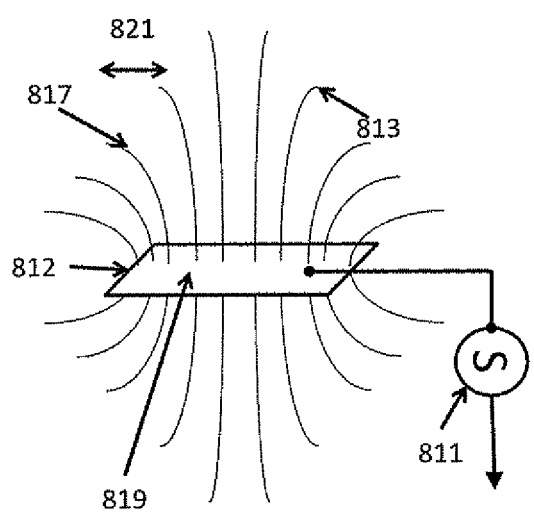
FIGS. 8A and 8B illustrate an electric field guarding configuration of the proximity sensor matrix used to improve height map image.
Figure 8B:
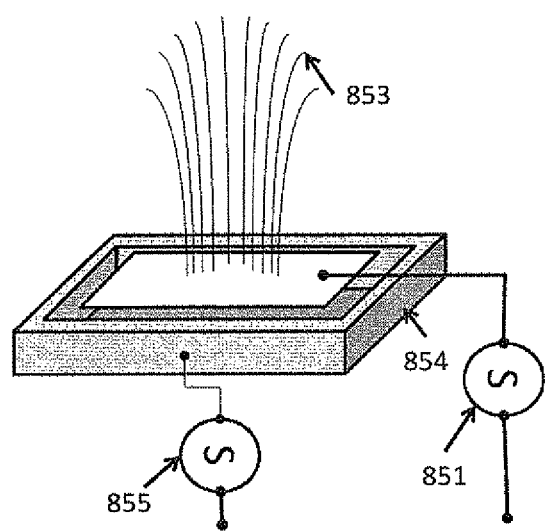

Reference is made to FIGS. 8A and 8B showing an example of the configuration and operation of a proximity sensor unit suitable to be used in the present invention. As shown in FIG. 8A, when a voltage signal 811 is applied to a sensing surface (e.g. that of the single pad) 812, electric field lines 813 propagate in all directions, i.e. the electric field lines are scattered. This increases the "field of view" or the "sensing zone" of the sensor (pad or the entire matrix), enabling sensing of objects which are not exactly aligned with the sensing surface. For example, a physical object, such as user's hand, located in the vicinity of a space region 817 may be detected as an electric signal representing a physical object at segment 819, As a consequence, position deviation 821 occurs and obscures the position information extracted from the sensing surface. Deviation 821 can be prevented or substantially eliminated by the utilization of a frame surrounding the sensing surface. This is exemplified in FIG. 8B.

As shown, a frame 854 made of one or more electrically conductive materials at surrounds (at least partially) a sensing surface (e.g. pad) of a proximity sensor matrix. The proximity sensor matrix and the frame are electrically connected to power supply units 851 and 855 which may be either DC or AC power source. By flowing electric current by the voltage source 855, the electric field 853 is more focused or more parallel. By utilizing this technique for the read out, both the position and height readings are more accurate. Where the sensing surface surrounded by the frame is used for obtaining a height map, the image obtained is more accurate. The use of the frame(s) in conjunction with the sensing surface (pads) also eliminates the influence of the hand holding the device. To manipulate the electric field line as illustrated in FIG. 8B, the back and sides of the sensing surface are surrounded by conductive frame 854 applied with the same voltage by source 855 as the sensing pad itself. Since there is no potential difference between the frame (guard) and the sensing pad, there is no electric field between them. As a result, any conductive object (e.g. the hand holding the device), located aside or behind the sensing pad, would form an electric field with the guard rather than with the sensing pad. As for the sensing pad, only the unguarded surface region thereof would be allowed to create electric field with a conductive object.

In addition or as an alternative to the use of the conductive frame surrounding the sensing surface of the matrix, another technique can be used, according to which each pad in the sensor matrix is surrounded with other pads (acting as the above-described frame) which afford essentially similar more focused field lines. This effect is produced by the transmitting or sensing from all pads simultaneously. The pads surrounding a certain sensing pad act as the "electric field guard" of said certain sensing pad. Optionally, the sided of the above described frame are implemented using circuit interlayer vias (conductive holes through the PCB layers).

Turning back to FIGS. 7A and 7B, a hardware circuitry associated with every sensing pad 706 includes an amplifier 702, A-to-D converter 703 (or A-to-D channel), and an interface line to a CPU 704. The amplifier and the A-to-D converter will be further referred to as "sensing pad interface" or "interface". In some embodiments, where high resolution proximity sensor matrix might be needed, and accordingly a number of sensing pads in the matrix needs to be rather high, reducing the number of interfaces in a proximity sensor matrix is a requirement.

Figure 9:
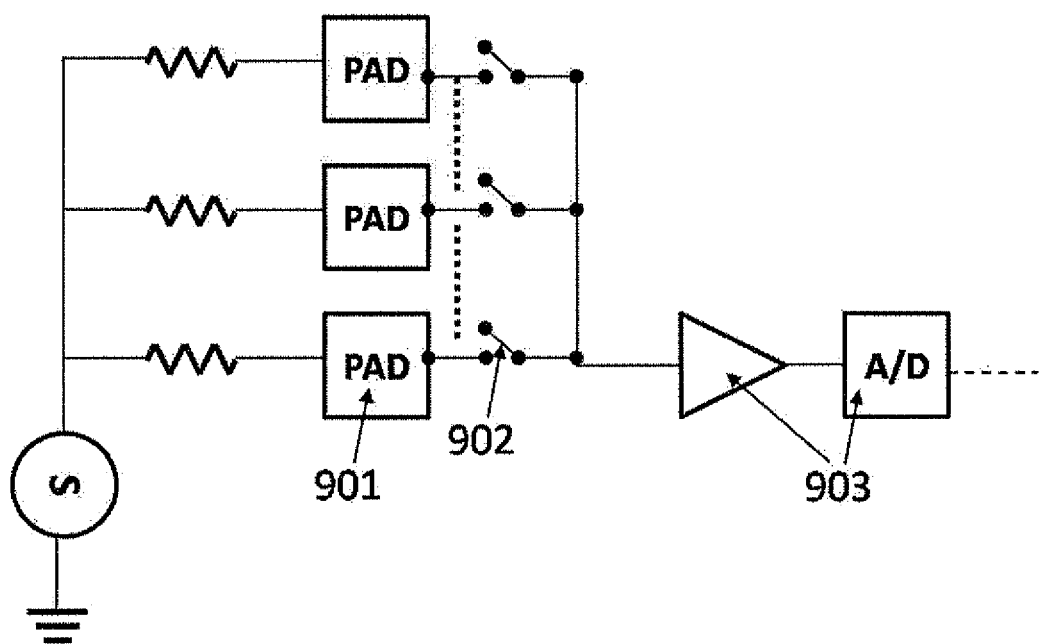
FIG. 9 is an example of hardware optimization, by using several capacitive sensing pads switched in time to the same circuit.

FIG. 9 describes the principles of a time division method suitable for read out from the array of sensing pads. A batch of sensing pads 901 (2 pads or more) is connected to a single interface 903. At a given time, only one sensing pad from the batch is connected to the interface. This can be done by using switches 902, whose state is known to the CPU (704 in FIG. 7B). The size of batch 901 defines the total required number of the interfaces. The greater the size of the batches, the lesser is the required number of interfaces.

Another known in the art technique suitable to be used in the invention is a frequency division. Two or more sensing pads 901 can simultaneously be connected to a common interface, each being excited with an orthogonal frequency with respect to the other. In this embodiment, two or more pads can be processed by a mutual interface simultaneously. As a result, the interface produces a summation of the signals. Because of the orthogonally, each frequency can be separated or analyzed separately from the summation. The result of each frequency analysis is associated with its corresponding pad from which it was originated.

When a high number of sensing pads (e.g. hundreds or thousands of sensor pads) is used, the wiring of the signal lines and switch control lines is rather complicated. In order to simplify the wiring in such case, another arrangement and operation of the plurality of sensing pads can be used. This is exemplified in FIG. 10. Here, multiple pads, generally at 1002, are arranged so as to be coupled to a common interface 1004. A distributed shift register scheme 1005 is used to facilitate obtaining a desired time frame during which each pad is separately coupled to the interface, thus allowing measurements from the plurality of sensing pads via the mutual interface in different time frames/slots.

As will be elaborated, besides the simplification and flexibility in circuit wiring, there is another advantage for this configuration which can be utilized in embodiments where the capacitance is translated to a DC level. A line 1001 connects the sensing pads via their respective switches 1003 near the pads, and is connected to the interface 1004. The switches 1003 are controlled by a distributed shift register. In a not limiting example, the distributed shift register is implemented via D-flip-flops 1005 configuration which is generally any flip-flop arrangement providing the functionality explained herein. Each D-flip-flop 1005 (one component of the shift register) is located in proximity to a sensing pad. As an illustrative example, a pulse 1006 is provided to the first D-flip-flop 1020 resulting in that the first pad is electronically coupled to the interface 1004. The next clock pulse 1007 effect is that only the second pad will be coupled to the interface, and so on. One of the advantages of this embodiment is that it eliminates a need for any central switching unit and complex routing or wiring. In one configuration, the routing can be done in a single layer.

Figure 10:
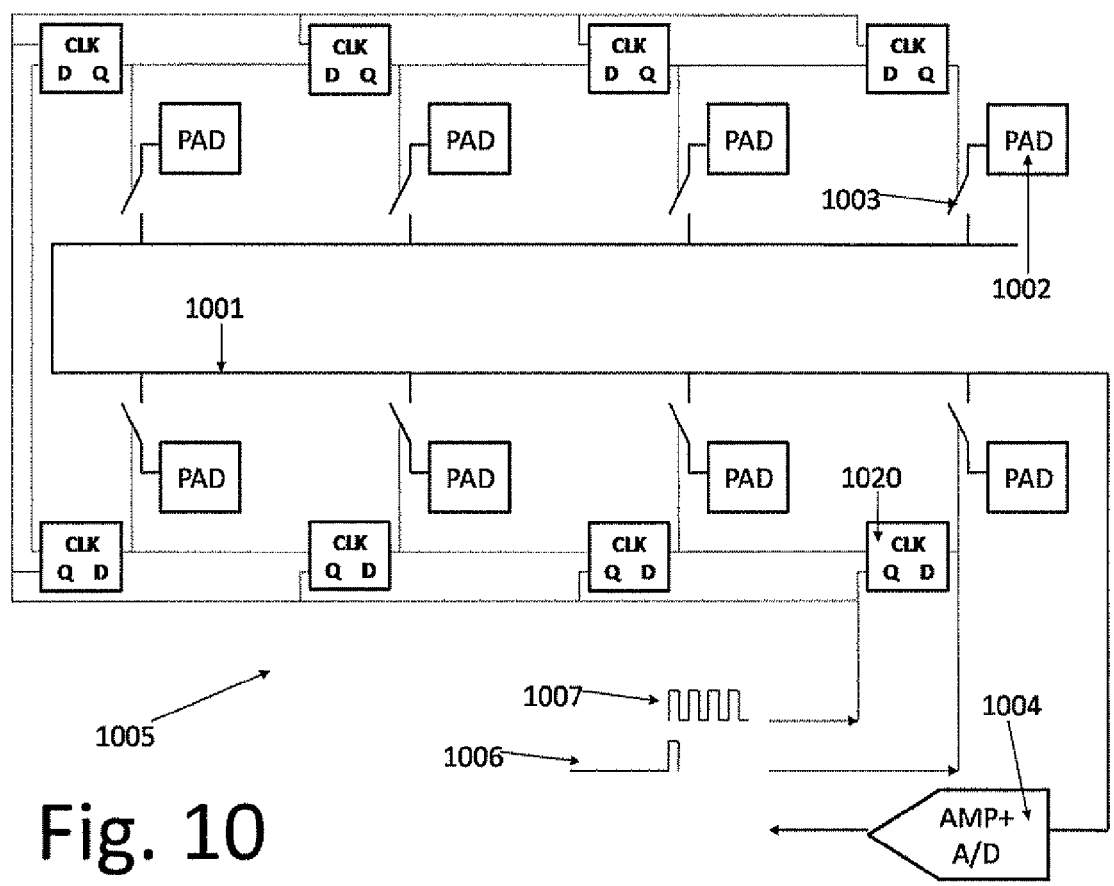
FIG. 10 illustrates the hardware simplification by a distributed switch system in the proximity sensor matrix.

In some embodiments, the capacitance measurement is performed by obtaining a DC level in a certain relation with (e.g. proportional to) the capacitance. The arrangement exemplified in FIG. 10 provides for using the entire refresh cycle time for integration of measurements. This increases sensitivity of the capacitance measurements. The measurement is obtained even during the time that a particular pad is not coupled to the interface. Therefore, the entire refresh cycle can be used to obtain the proximity measurements for all the pads in parallel. Refresh cycle time in this context means the time required to update the height map image. By the end of the integration time, the resulted DC levels are read rather fast using an arrangement exemplified in FIG. 10.

The hardware and DSP algorithms supply 2D positioning of an object in a plane of the sensing surface and the proximity (distance) measurement, in a rate which is determined by the sampling time needed to assure stable measurements, and the size of batches of sensing pads. For example, if the sampling time needed for stable measurement is T and the size of a batch is N, the refresh rate is roughly 1/(T·N). Time T needed for stable measurement may for example be around 1 msec, although other time intervals may be employed. If the sensing surface includes 1000 sensing pads, and a batch size is N=10 (i.e. 100 sensing pad interfaces), then the refresh rate is 100 Hz.

Figure 11A:
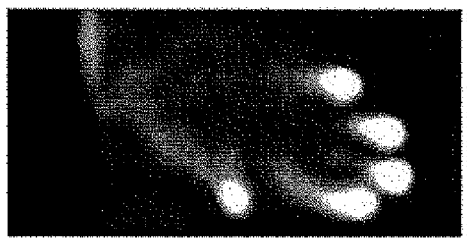
FIGS. 11A-11D show an example of the processing technique applied to the output of the sensor matrix for generation of the measured data indicative of the behavior of the object in the vicinity of the sensor matrix.
Figure 11B:
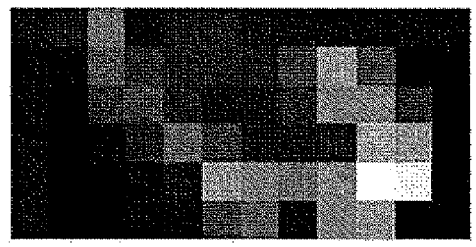

Reference is now made to FIGS. 11A-11D showing an example of the processing technique applied to the output of the sensor matrix for generation of the measured data indicative of the behavior of the object in the vicinity of the sensor matrix (i.e. in the coordinate system of the sensor matrix). The sensing surface area of a sensing pad in the proximity sensor matrix defines a boundary of the sensitivity zone of the pad, In particular embodiments, the surface area is between 9 mm$^2$-400 mm$^2$, 36 mm$^2$-400 mm$^2$, 81 mm$^2$-400 mm$^2$ and even higher than 400 mm$^2$ Increasing the surface area of each pad allows detection of more distant physical objects, or in other words allows for increasing the sensitivity zone. The distance may range from 0 to 3 cm, 1 to 4 cm, 1 to 5 cm, 2 to 5 cm, 2 to 6 cm, and 3 to 7. Increasing the surface area of the pad also provides for reducing the energy consumption and hardware complexity. On the other hand, extended sensitivity zone of the sensing pads results in lower resolution of measurements in the X-Y plane (lower resolution height map). FIG. 11A is a high resolution map image of a hand located above a proximity sensor matrix. FIG. 11B is a low resolution map image obtainable from a sensor matrix having a relatively low resolution as a result of using sensing pads of extended surface area. Therefore, the behavior of the physical object cannot be extracted using a simple image processing algorithm.

The inventors have developed a novel processing scheme to detect the posture of a physical object or the location of a portion thereof. The reference is made to FIG. 12 exemplifying such processing scheme 1200. In a particular embodiment, the physical object is a user's hand and the potions thereof are finger tips. The processing scheme utilizes a model of the physical object being monitored, for example a user's hand model. The model allows for parameterization of the physical object being monitored or tracked. Proximity measurements 1205 (i.e. output of the proximity sensor matrix) are provided, e.g. in the form of a height map, previously exemplified in FIG. 11A-11D.

Figure 11C:
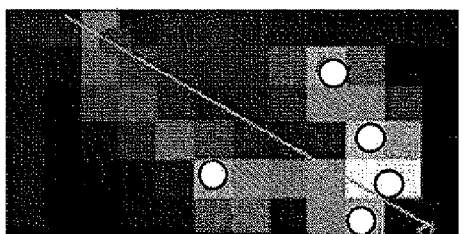
Figure 11D:
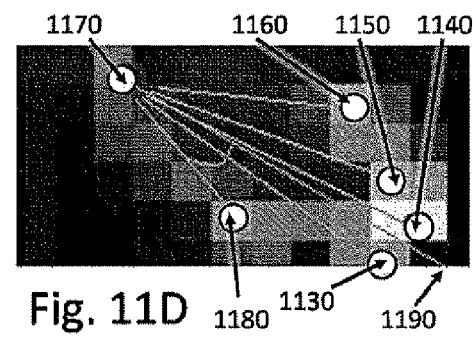

By way of a non-limiting example, the hand model is a collection of predefined parameters (or feature set). The values of the feature set correspond to the hand particular state, configuration, posture and/or position. An example of such feature set is illustrated in FIGS. 11C and 11D. FIG. 11D provides a hand model according to which the hand is represented by up to five hand portions. The hand portions in accordance with this model describe the palm, and each particular finger of the hand. In particular, the thumb, the index finger, the middle finger, the ring finger and the little finger. These five fingers on the hand are used for representing the user's hand behavior.

The person skilled in the art would appreciate that hand model can include any subset of hand portions including but not limited to thumb, the index finger, the middle finger, the ring finger and the little finger. For example, the predefined hand model, which is a collection of predefined parameters (or feature set) values may be indicative to the hand spatial state. As will be described more specifically further below, the model may be selected to enable "object independent" interpretation of the object-related measured data to provide the approximate representation of the object behavior. An example of such feature set is illustrated in FIG. 11D. An origin to vector space is set at the (tracked) carpal 1170. The extracted parameters are angles between a vector which represents the palm direction and the vectors going through the (tracked) fingers tip locations. Generally, the hand model can comprise the palm, the index finger and the middle fingers. In some other examples, other selection of hand portions can be utilized. In particular, the hand model can further comprise a palm direction 1190. The palm and four fingers can be folded over the palm which allows the grasping of virtual object objects and like.

The following is a specific but not limiting example of the operation of the "object (user) independent" data processing utility of the present invention.

FIG. 11D illustrates a hand model in which the hand is represented by a palm 1170 and all 5 fingers, namely, the index finger 1130, the middle finger 1140, the ring finger 1150 and the little finger 1160. The model includes the distance (or range of distances) between the palm and each of the fingers. The model also includes the possible and actual angles between the distance lines being drawn, for example, for the palm to each respective finger.

In some embodiments, such as that of FIG. 11D, an origin of the hand is defined as the carpal. The origin of the hand can thus be tracked. The extracted parameters can be angles 1180 between a vector/line which represents palm direction 1190 and the vector/line drawn between the palm 1170 and each finger tip location 1120, 1130, 1140, 1150 and 1160. In some embodiments, the finger tip location and the palm are extracted from the height (proximity) measurements or the height map signal intensities shown for example in FIG. 11B. In some embodiments, the hand model assumes that the hand posture is such that the finger tips are in general closer to the proximity sensor matrix in comparison to the palm origin and therefore signal intensity indicates the location of a finger tip.

In some embodiments, identification of the position and proximity of a portion of the physical object requires filtering of the position (X,Y) and proximity (Z) measurements.

Turning back to FIG. 12, in some embodiments, after obtaining the input information 1205, enhancement of the quality of the image 1230 might be desired and performed by applying noise filtering. Alternatively or in addition thereto, offset and drifts corrections are performed. Noise reduction in the present invention can be performed by calculating the average of the measurements obtained from the sensing pads. Typically, the reading of each sensor pad can be averaged for multiple measurements.

The processing scheme 1200 further includes a procedure 1240 of extraction of information from the input data 1205. The input may be further processed to extract features of the physical object being monitored. The extracted features can be referred to as features vector or set. These features are measurements of each element in the physical object model. These measurements can be continuous or quantized. Elements of the features vector can be the position(s) of a portion of an object.

One possible physical object is the user's hand in which case the features extracted can be those illustrated in the example of FIG. 11D (angles 1180 between a vector/line which represents palm direction 1190 and the vector/line drawn between the palm 1170 and finger tip locations of the observable fingers). The person skilled in the art would understand that for each application the suitable hand model or the suitable physical object model is considered. The palm location and palm direction features can be extracted from the proximity measurement or acquired enhanced image. In this manner, measurement of the values for the features of the set in the hand-based model can be obtained. PCA (principle component analysis) may be used to measure the palm direction 1190 shown in FIG. 11C. At the first stage, the physical object is assigned with the locations of portions (or points) of the object. Prior to and/or after the first stage, an estimate of the location(s) of the physical object, such as the observable finger tips (being within the sensitivity zone of the sensor matrix) or palm can be calculated from a low resolution map, e.g. that of FIG. 11B.

Optionally, estimating the location of the portions of the object being monitored can be performed by finding the highest local maxima, i.e. the portion/point of a physical object which is detected as being the closest to the proximity sensor matrix. In some other embodiments, clustering algorithm is applied to determine clusters with similar brightness patterns and which optionally comply with several rules. These rules may be those defining size and proximity to edges or acceptable limits of the object being monitored.

Figure 13A:
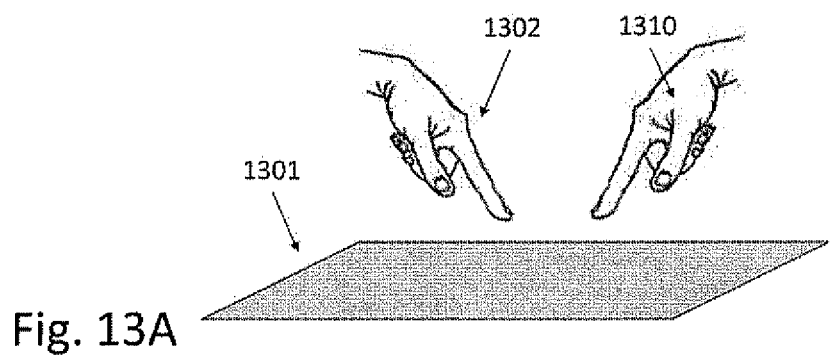
FIGS. 13A and 13B show an example of a specific hands scenario above the sensing surface and the corresponding height map data.
Figure 13B:
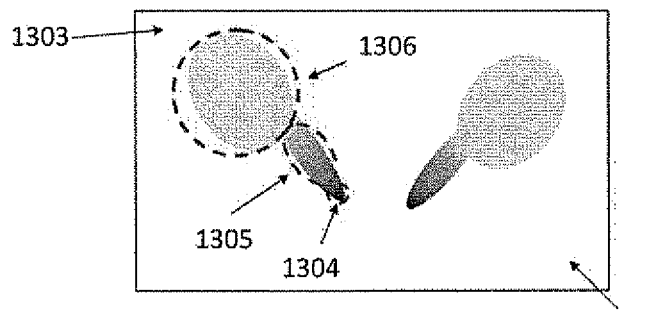

An example of the clustering result is shown in FIGS. 13A-13B. FIG. 13A shows user's hands 1302 above a sensing surface 1301. FIG. 13B shows a corresponded proximity map image 1303 obtained for further processing. Segmentation algorithm is applied which finds segments of pixels (sensing pads) of similar height/proximity or patterns (e.g. segments 1304, 1305 and 1306 marked by dashed circles). Then, centers of masses can be calculated.

The inventors have found that utilizing the angles-based features set as shown in FIG. 11D allows for determining the hand state or posture. In should be noted that the angle features were found to be "user independent".

It should be mentioned that the number of elements in the feature vector (such as number of angles found) can vary. The number of elements in the feature vector corresponds (equal) to the number of the observable fingers.

Turning back to the processing scheme 1200, a tracking procedure 1250 is performed for tracking the physical object being monitored.

The tracking procedure 1250 may include finding of the approximated posture of the physical object being monitored. Typically, the posture includes accurate positioning of some of the physical object portions. If the physical object is a hand, the input to the procedure is the features set extracted in the previous stage and the observable finger tips' positions. The tracking procedure has two sub-steps:

1) Procedure for finding the posture of the hand that best fits the measurements. This procedure is composed of two elements as well:
 a) Finding the tags of visible fingers (which are below certain height and within the region of interest (ROI)). At this point, a trained HMM (Hidden Markov Model) was used, the principles of which are known per se and therefore need not be described in details. The model contains 32 hidden states, each represents tagging of a subset of visible fingers (each of the 5 fingers can be visible or not, therefore 32 states are needed). The observations are the extracted features set mentioned above (e.g. quantized angles). The transition probabilities between the states and observation emissions probabilities are trained offline, according to standard HMM training routine, to suit typical hand motion.

The search for the current hidden state is done by running Viterbi Search in an online fashion. The current observation it considered to end a series of observations, according to which a Viterbi path is found (a path with maximum probability). The desired hidden state is selected to be the last state of this path. It should be noted that the use of HMM model allows for considering such effects that the thumb is typically capable of being rotated 90°, on a level perpendicular to the palm, while in contrast, the other fingers can only be rotated in a more limited manner. The model can typically include the size of bones, optionally represented by a distance between the finger tips and the palm.

b) Matching the tags to the given tip positions. Let L be the previous positions vector to which tags are given; C be the current positions vector without tagging. A full bipartite graph is constructed between L and C. The Hungarian method is used to find optimum match between L and C, where the object function is a minimum sum of distances. Tagging is given according to the resulted matching, Optionally, L contains predicted locations instead of locations to stabilize the matching. Optionally, the prediction is given from the Kalman filter described below.

2) Procedure for smoothing the positions by filtering. Tip positions calculated using the center of mass, or interpolation, on the height map image are rather coarse, due to noise. In some embodiments, the smoothing is done by averaging with history locations, where the weights given for the history locations decrease with the increment of the velocity. In some other embodiments, the smoothing is done by Kalman filter. The state transition matrix is given by:

$$\begin{pmatrix} X_{t+1} \\ V_{t+1} \\ A_{t+1} \end{pmatrix} = \begin{pmatrix} 1 & \Delta t & \frac{\Delta t^2}{2} \\ 0 & 1 & \Delta t \\ 0 & 0 & 1 \end{pmatrix} * \begin{pmatrix} X_t \\ V_t \\ A_t \end{pmatrix}$$

where X stands for position, V stands for velocity, A stands for acceleration and $\Delta t$ stands for the time difference between t and (t+1), which corresponds to the refresh cycle time.

The matrix corresponds to a constant acceleration motion. Though accelerations in human behavior are not typically constant, the Kalman filter allows to model acceleration changes as white noise.

Figure 12:
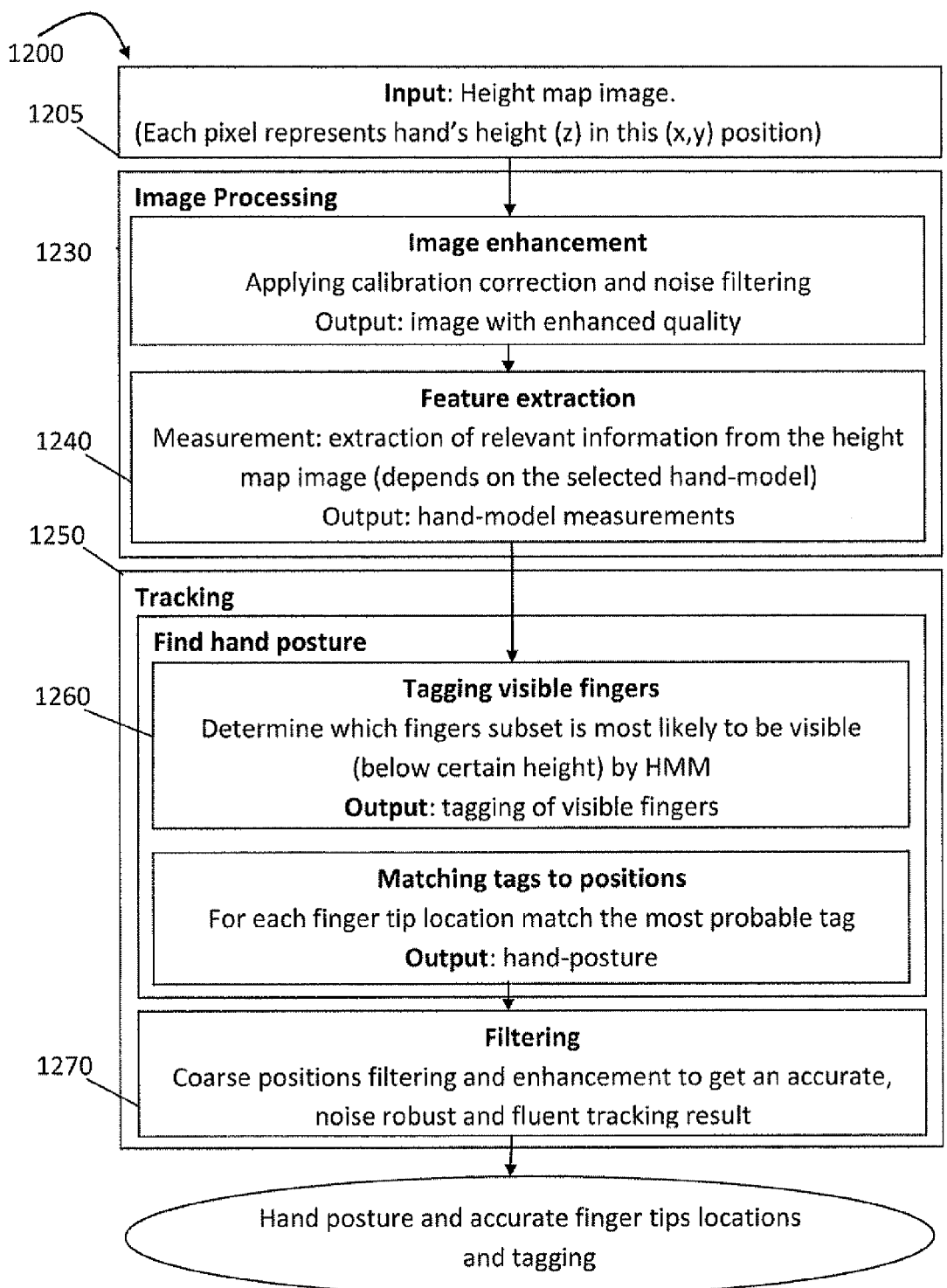
FIG. 12 is a flow chart exemplifying a method of the present invention for processing measured data to enable transformation into said approximate representation, using features set enabling object independent processing.
Figure 15:
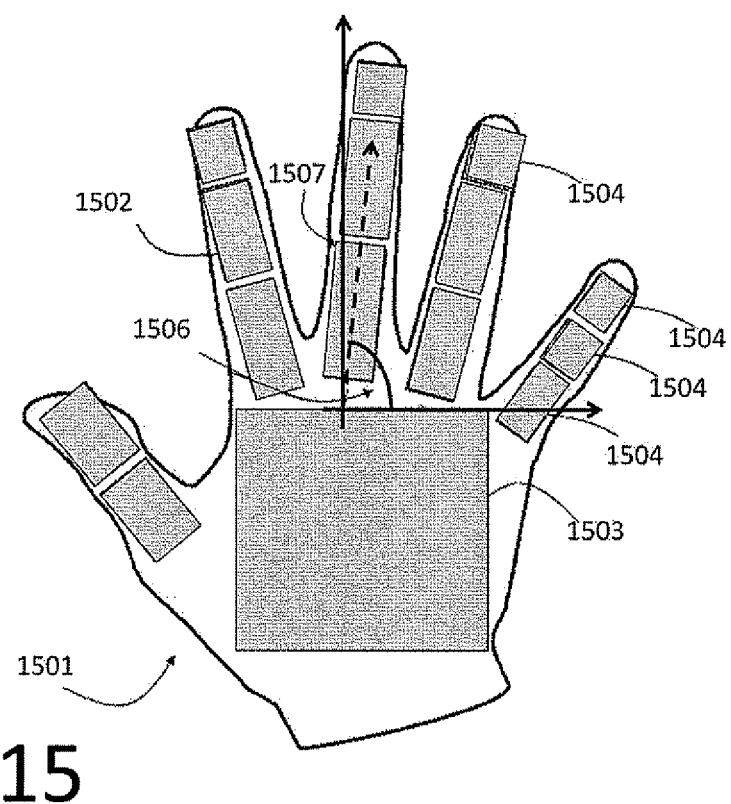
FIGS. 15 and 16 show another example of the present invention utilizing object dependent processing of the measured data, where

The above described example of FIG. 12 corresponds to the so-called "object independent" processing technique. The following is an example of "object dependent" processing method, described with reference to FIGS. 15 and 16.

This technique utilizes a learning session of features values of the specific user whose behavior is being monitored. A hand 1501 is decomposed to a collection of rectangles 1502 having user specific dimensions and which are measured during the learning session. Each rectangle represents a specific hand portion and has several parameters for tuning. Those parameters describe the rectangle spatial posture, e.g.

the palm rectangle 1503 has 6 parameters: x, y, z, alpha, beta and gamma (6 degrees of freedom), and each phalange 1504 has one or two spatial angles in respect to its origin knuckle (depends on whether its origin is the palm or a phalange), e.g. angle 1506 for a phalange's rectangle 1507 (thus a phalange's rectangle has only one or two degrees of freedom). Overall, there is a finite set of parameters that describe the hand posture.

Figure 16:
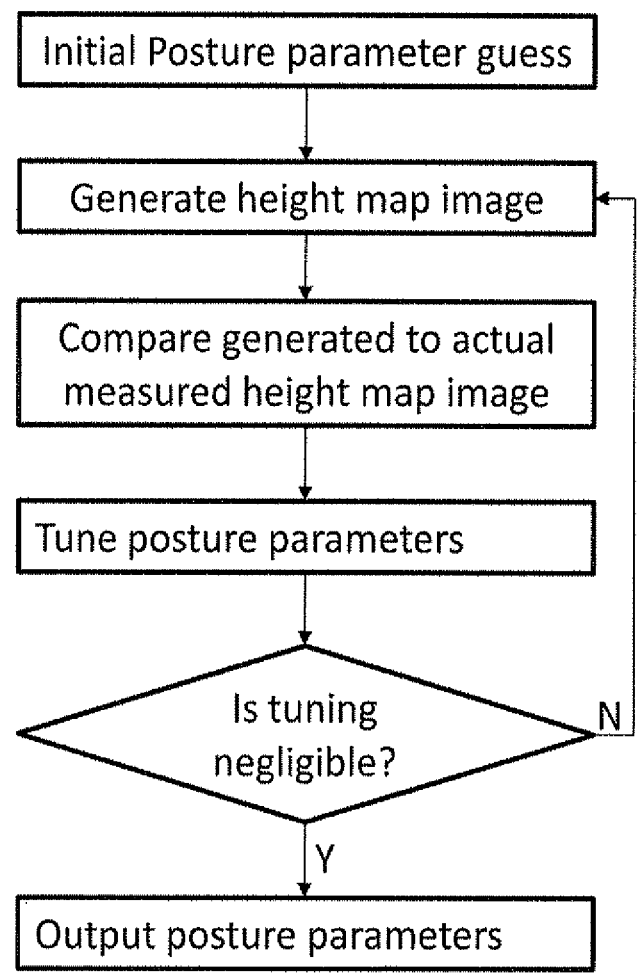

The processing technique tunes those parameters as exemplified in FIG. 16. An initial guess is given (will be further elaborated how) by which a correspondent height map image is generated. This generation is done according to an electric field model. The so-generated height map ("virtual" height map) is compared to the actual measured height map (as received from the input device) using some metric, e.g. Euclidian, to give an error result upon which a parameters search optimizer (e.g. downhill simplex) is guided to tune the guess towards the optimum parameters' values, which correspond to the current, real hand posture. The search keeps iterate until the parameters modification is small enough.

The closer is the initial guess to the optimum, the faster is the convergence of the search. Therefore, the guess is taken as the preceding hand posture parameters. Since the behavior of the hand is continuous, this guess is rather close to the optimum, and the convergence is done within a few steps (excluding the first search which has no history to depend on). This also can be solved by requiring an initial hand posture from the user.

This approach suits for the scenario of monitoring behavior through a low resolution image where conventional image processing is not sufficient.

It should be noted that both the user dependent and independent methods keeps a unique ID per finger which change neither over time nor different sessions, e.g. the little finger always gets ID "1", the index finger always gets ID "4", etc. This enables a platform to finger specific gestures.

Figure 14A:
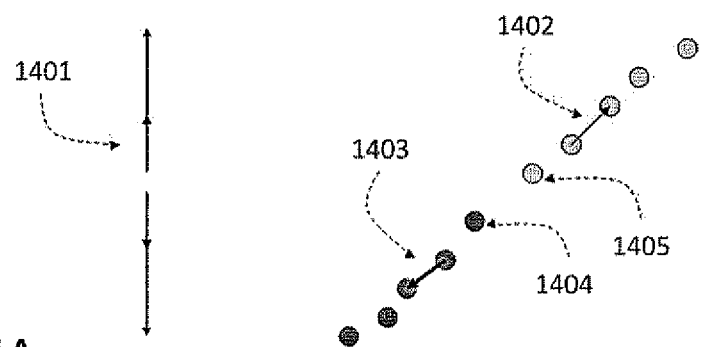
FIGS. 14A-14B illustrate gestures recognition technique using tracking information of fingers tip.
Figure 14B:
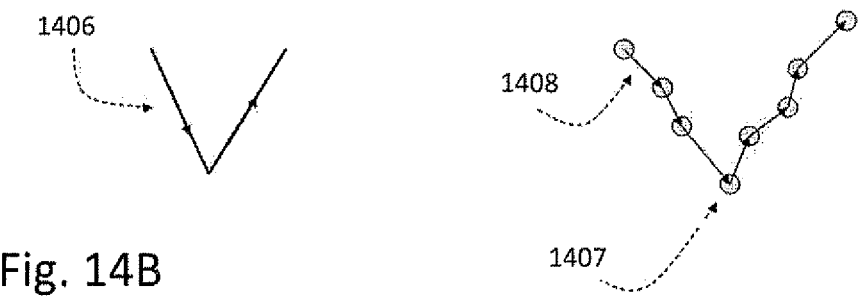

The present invention may utilize the gesture recognition according to which the trajectories of the tracked IDs are examined. If one or more trajectories comply with a predefined pattern associated with some gesture, corresponding data is generated. Examples are shown in FIGS. 14A-14B, In FIG. 14A the compliance of two IDs sets of points 1402 and 1403 to "Zoom Out" gesture 1401 is tested. If the origins of the two IDs trajectories are closed (e.g. distance between point 1404 and point 1405 is less than 2 cm), and the trajectories directions (e.g. 1402 and 1403) are approximately 180 degrees from each other, a Zoom Out gesture is generated. At FIG. 14B, the compliance of one ID set of points to "OK" gesture 1406 is tested. If the directions of segments made from two consecutive points (e.g. 1408) are within the range of angles until certain point 1407, from which directions of segments made from two consecutive points are within another range of angles, an "OK" gesture is generated. Other simple shapes trajectories can be recognized using Hough transform. More complex gestures recognition can use statistical learning methods known in the art of hand-write recognition as HMM (Hidden Markov Model). Some of the mentioned methods can be expanded to 3D gesture recognition, by considering directions and lengths in 3D space instead of 2D space.

It should also be noted that the position sensor matrix may utilize a touch sensor (the touch-type proximity matrix) to sense the physical object touches and a standard camera within a line of sight from the sensor. In this embodiment, the hand image is isolated when hovering on the sensor, transforming this image to the coordinate system of the touch sensor. This image is used for the representation of the physical object and the touch sensor is used to distinguish between touch and hover.

Generally, camera(s) can be used in combination with a proximity matrix sensor. The camera's field of view intersects with the line of sight to a user hand and a predefined physical object such as flat surface and a processing module/utility capable of monitoring and interpreting the hand behavior relative to the predefined physical object. The use of combination of imager and touch-type proximity sensor matrix might be used to enable/improve generation of the measured data corresponding to 3D coordinate system.

The invention might provide for measure an effect of pressuring by one or more portions of the physical object of the touch-type sensor in addition to the object behavior monitoring as described above. This may be done by adding a flexible layer made of flexible material(s) such as silicon on top of the proximity detector matrix. By doing that, all measured height smaller than the width of the flexible layer may be transformed to pressure values.

The invention claimed is:

1. A method for monitoring behavior of at least a part of a physical object with respect to a sensing surface so as to target and activate a virtual object on a remote screen, the method comprising:
   (a) providing measured data indicative of a behavior of at least a part of a physical object with respect to a predetermined sensing surface, said measured data being indicative of said behavior in a first three-dimensional space;
   (b) processing said measured data indicative of the behavior of said at least part of the physical object in said first three-dimensional space with respect to the sensing surface and transforming said measured data into an approximate representation of said behavior in a virtual coordinate system, the transformation maintaining a three-dimensional positional relationship between virtual points in said virtual coordinate system and corresponding portions of the physical object in said first three-dimensional space, the approximate representation including a representation of the distance from the corresponding portions of the physical objects to the sensing surface, said representation of the distance being indicative of a hovering height between said at least part of the physical object and said sensing surface; and
   (c) displaying on the remote screen said approximate representation of the behavior of said at least part of the physical object, wherein the virtual object is targeted in hover on the remote screen, while being activated by touch of said sensing surface.

2. The method of claim 1, wherein said approximate representation comprises representation of said at least part of the physical object.

3. The method of claim 1, wherein the predetermined sensing surface defines said first three-dimensional space being a remote coordinate system with respect to the virtual coordinate system.

4. The method of claim 1, wherein the sensing surface is capable of generating said measured data in either one or a combination of both contact and contactless modes.

5. The method of claim 1, wherein the sensing surface is capable of detecting absolute or relative position for each of said corresponding portions of the physical object with respect to the sensing surface.

6. The method of claim 5, wherein said measured data is in the form of a signal intensity map in said first three-dimensional space, said transforming comprises processing said signal intensity map.

7. The method of claim 1, wherein said measured data is generated by a sensor matrix of said predetermined sensing surface.

8. The method of claim 7, wherein said sensor matrix of the sensing surface is capable of detecting user finger hand and tip locations in said first three-dimensional space.

9. The method of claim 1, comprising transmitting data to a remote location of said virtual coordinate system, the data being transmitted being either indicative of said approximate representation, or the measured data to enable said processing of the measured data into said approximate representation at said remote location.

10. The method of claim 9, wherein said transmitting comprises wireless signal transmission selected from the group consisting of at least one of IR, Bluetooth, radio frequency (RF), and acoustic transmission.

11. The method of claim 1, wherein said predetermined sensing surface is a surface of a proximity sensor matrix.

12. The method of claim 1, wherein said predetermined sensing surface is a surface of a capacitive proximity sensor matrix.

13. The method of claim 1, wherein the data indicative of said behavior comprises at least one of the following: (a) a position of the portions of the physical object with respect to said predetermined sensing surface; (b) a change in position of the portions of the physical object with respect to said predetermined sensing surface; (c) a motion pattern of the portions of the physical object with respect to said predetermined sensing surface.

14. The method of claim 1, wherein the data indicative of said behavior comprises at least one of a change in position of the portions of the physical object with respect to said predetermined sensing surface, and a motion pattern of the portions of the physical object with respect to said predetermined sensing surface, said providing of the data indicative of the behavior of at least a part of the physical object comprises detecting the position of said at least part of the object using either one or a combination of both of a continuous detection mode and a sampling detection mode.

15. The method of claim 1, wherein said transformation comprises determining data indicative of a distance between each of the virtual points and each of the corresponding portions of said at least part of the physical object.

16. The method of claim 1, comprising identifying said at least part of the physical object, to thereby allow generation of the measured data.

17. The method of claim 16, comprising identifying noise energy in the vicinity of said proximity sensor matrix and operating the proximity sensor matrix accordingly.

18. The method of claim 17, wherein said noise energy is identified by a frequency being in or at least partial overlapping an operative frequency range of said proximity sensor matrix, the operation of the proximity sensor matrix upon identifying the noise energy comprising either preventing measurements by said proximity sensor matrix or shifting the operative frequency to be outside of said range.

19. The method of claim 1, wherein the physical object is associated with at least a part of a human body.

20. The method of claim 19, wherein the physical object is associated with multiple fingers of at least one human hand.

21. A method according to claim 1, wherein the distance of said at least part of the physical object from the proximity sensor affects at least one of: size, transparency level, darkness, color or shape of its corresponding presentation.

22. The method of claim 1, further including the step of displaying the approximate representation on the remote screen.

23. The method of claim 1, wherein said providing of the measured data comprises obtaining data indicative of a path along which position of said at least part of the physical object is being changed with respect to the sensing surface.

24. A monitoring unit for use in monitoring a behavior of at least a part of a physical object with respect to a sensing surface so as to target and activate a virtual object on a remote screen, the monitoring unit comprising:
   a data input module configured for receiving measured data indicative of a behavior of at least a part of the physical object in a certain three-dimensional space associated with a predetermined sensing surface, said measured data being indicative of said behavior in a three-dimensional space; and
   a processor configured and operable to be responsive to said measured data for transforming the measured data into an approximate representation of said at least portion of the physical object into a virtual coordinate system such that the transformation maintains a three-dimensional positional relationship between virtual points in said virtual coordinate system and corresponding portions within said at least part of the physical object in said three-dimensional space, the approximate representation including a representation of the distance from the corresponding portions of the physical objects to the sensing surface, said representation of the distance being indicative of a hovering height between said at least part of the physical object and said sensing surface, and for sending for display on the remote screen said approximate representation of the behavior of said at least part of the physical object, wherein the virtual object is targeted in hover on the remote screen, while being activated by touch of said sensing surface.

25. A device for use in monitoring a behavior of a physical object, the device comprising:
   the monitoring unit of claim 24, and
   a position sensor device linked to the input data module of the monitoring unit, said position sensor device defining said sensing surface and said certain three-dimensional space and being configured and operable to generate said measured data indicative of the behavior of said at least part of the physical object in said certain three-dimensional space relative to said sensing surface.

26. The device of claim 25, wherein said position sensor device comprises a proximity sensor matrix capable of generating said measured data in either one or a combination of both of contact and contactless modes.

27. The device of claim 26, wherein said proximity sensor matrix is associated with a keypad of an electronic device where the approximate representation of said behavior is to be applied, said measured data being indicative of the behavior of user's fingers with respect to symbols of the keypad.

28. The device of claim 25, wherein said sensing surface is capable of detecting absolute or relative position for each of said corresponding portions of the physical object to the sensing surface.

29. The device of claim 28, wherein said position sensor device is capable of generating said measured data in the form of a signal intensity map in said first coordinate system, said processor being operable for processing said signal intensity map.

30. The device of claim 25, comprising a transmitter unit configured for transmitting data indicative of said representation of said at least part of the physical object to a remote location of said virtual coordinate system, said data being transmitted in at least one of IR, Bluetooth, RF and acoustic transmission modes.

31. The device of claim 25, comprising a formatter utility connectable to an output of the processor and configured and operable to receive data indicative of said approximate representation and converting said data into a predetermined format of data input into a certain electronic device.

32. The device of claim 25, comprising a formatter utility connectable to an output of the transmitter unit and configured and operable to receive data indicative of said approximate representation and converting said data into a predetermined format of data input into a certain electronic device.

33. A device for use in monitoring a behavior of a physical object, the device comprising:
    the monitoring unit of claim 24, and
    a data input unit configured to define said virtual coordinate system, said data input unit being linked to an output of said processor for receiving data indicative of said approximate representation.

34. The device of claim 33, comprising a formatter utility interconnected between said output of the processor and said data input unit, and being configured and operable to receive data indicative of said approximate representation and converting said data into a predetermined format of data input into said data input unit.

35. The device of claim 33, comprising a signal receiver unit configured for receiving the measured data indicative of said behavior with respect to the sensing surface and being in the form of at least one of IR, Bluetooth, RF and acoustic data and generating corresponding data input into said processor.

36. A system for monitoring a behavior of at least a part of a physical object with respect to a sensing surface so as to target and activate a virtual object on a remote screen, the system comprising:
    (a) a position sensor comprising a sensing surface and defining a first three dimensional coordinate system within a sensing region in the vicinity of the sensing surface, the position sensor being configured and operable to generate measured data indicative of the behavior of at least part of the physical object with respect to said sensing surface in said first three-dimensional coordinate system, said measured data being indicative of said behavior in a three-dimensional space;
    (b) a data presentation device defining a second coordinate system; and
    (c) a processor interlinked between the position sensor device and said data presentation device, and being configured and operable to be responsive to said measured data for transforming the measured data into an approximate representation of said at least part of the physical object into the second coordinate system such that the transformation maintains a three-dimensional positional relationship between virtual points and corresponding portions within said at least part of the physical object, the approximate representation including a representation of the distance from the corresponding portions of the physical objects to the sensing surface, said representation of the distance being indicative of a hovering height between said at least part of the physical object and said sensing surface, and for sending for display on the remote screen said approximate representation of the behavior of said at least part of the physical object, wherein the virtual object is targeted in hover on the remote screen, while being activated by touch of said sensing surface.

37. A hand held device for use in monitoring a behavior of a physical object with respect to a sensing surface so as to target and activate a virtual object on a remote screen, the device comprising a monitoring unit comprising:
    a position sensor device having a sensing surface and defining a sensing region in the vicinity of the sensing surface and being configured and operable to generate measured data indicative of behavior of at least part of a physical object in a certain three-dimensional coordinate system within said sensing region, said measured data being indicative of said behavior in a three-dimensional space; and
    a processor configured and operable to be responsive to said measured data for transforming said measured data into an approximate representation of said at least portion of the physical object into a virtual coordinate system such that the transformation maintains a three-dimensional positional relationship between virtual points and corresponding portions within said at least part of the physical object, the approximate representation including a representation of the distance from the corresponding portions of the physical object to the sensing surface, said representation of the distance being indicative of a hovering height between said at least part of the physical object and said sensing surface, and for sending for display on the remote screen said approximate representation of the behavior of said at least part of the physical object, wherein the virtual object is targeted in hover on the remote screen, while being activated by touch of said sensing surface.

* * * * *